US007779620B2

(12) United States Patent
Ishikawa et al.

(10) Patent No.: US 7,779,620 B2
(45) Date of Patent: Aug. 24, 2010

(54) AIR-FUEL RATIO FEEDBACK CONTROL DEVICE

(75) Inventors: Osamu Ishikawa, Tokyo (JP); Keiichi Enoki, Tokyo (JP); Hideki Takubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 751 days.

(21) Appl. No.: 11/607,005

(22) Filed: Dec. 1, 2006

(65) Prior Publication Data

US 2007/0277504 A1 Dec. 6, 2007

(30) Foreign Application Priority Data

Jun. 6, 2006 (JP) ............... 2006-157268

(51) Int. Cl.
*F01N 3/00* (2006.01)
(52) U.S. Cl. .......................... 60/285; 60/277
(58) Field of Classification Search .................. 60/277, 60/285, 276
See application file for complete search history.

(56) References Cited

U.S. PATENT DOCUMENTS

| 5,337,558 | A * | 8/1994 | Komatsu | 60/276 |
| 6,877,311 | B2 * | 4/2005 | Uchida | 60/277 |
| 2004/0216450 | A1 * | 11/2004 | Okazaki et al. | 60/285 |

FOREIGN PATENT DOCUMENTS

| JP | 61-286550 A | 12/1986 |
| JP | 61286550 A | * 12/1986 |
| JP | 06-129240 A | 5/1994 |
| JP | 09-203313 A | 8/1997 |
| JP | 10-047141 A | 2/1998 |
| JP | 10-54225 A | 2/1998 |
| JP | 11-036848 A | 2/1999 |
| JP | 11-270332 A | 10/1999 |
| JP | 2005-61221 A | 3/2005 |
| JP | 2005-194981 A | 7/2005 |
| JP | 2005-344598 A | 12/2005 |

* cited by examiner

*Primary Examiner*—Thomas E Denion
*Assistant Examiner*—Audrey Klasterka
(74) *Attorney, Agent, or Firm*—Sughrue Mion, PLLC

(57) ABSTRACT

In an air-fuel ratio feedback control device for a fuel injection control system, a catalyst deterioration diagnosing means for carrying out deterioration diagnosis of the catalyst is equipped with a diagnosis permission judging means for judging permission of the deterioration diagnosis of the catalyst on the basis of a driving area of the internal combustion engine, an air-fuel ratio varying means for varying the target upstream air-fuel ratio at the catalyst deterioration diagnosis time, a catalyst deterioration judging means for judging the deterioration of the catalyst on the basis of the downstream air-fuel ratio detection output at the catalyst deterioration diagnosis time, and a catalyst deterioration diagnosis prohibiting means for setting a deterioration diagnosis prohibition time of the catalyst after the catalyst deterioration diagnosis.

6 Claims, 31 Drawing Sheets

(CONTINUE TO FIG. 8B.)

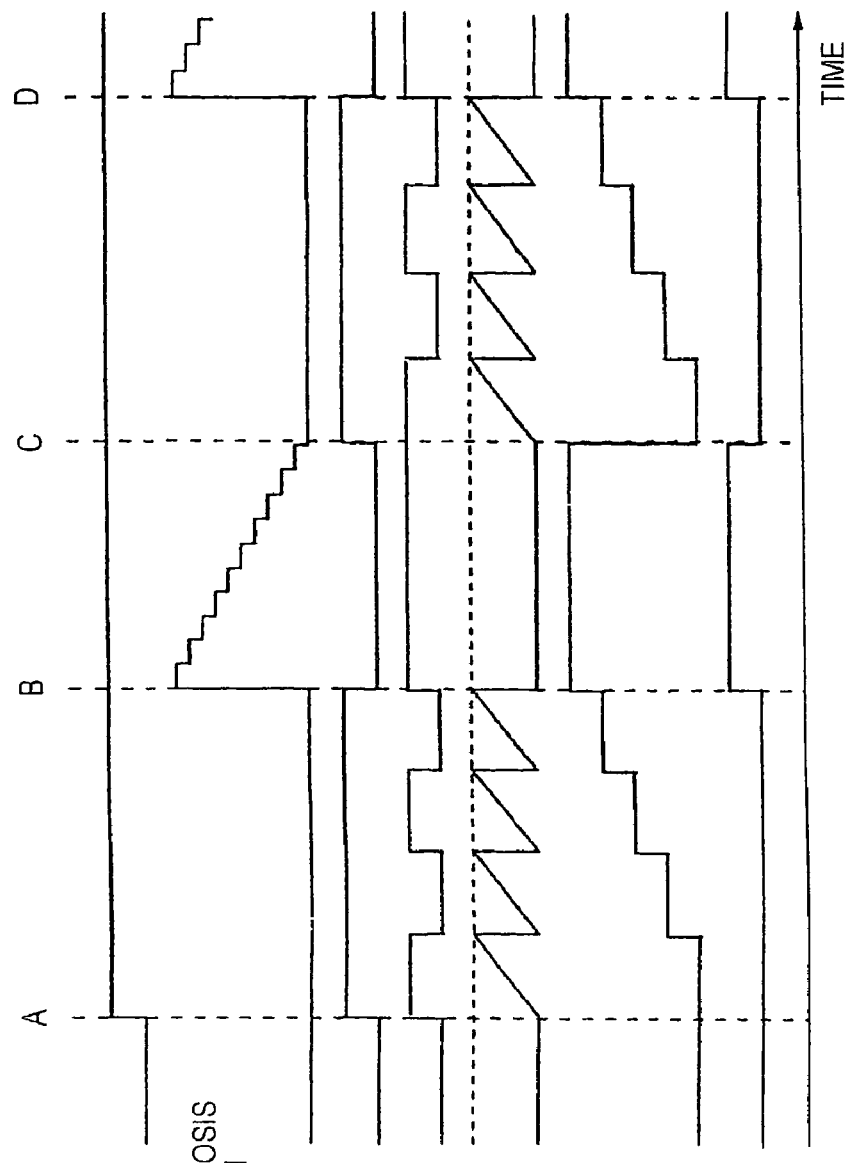

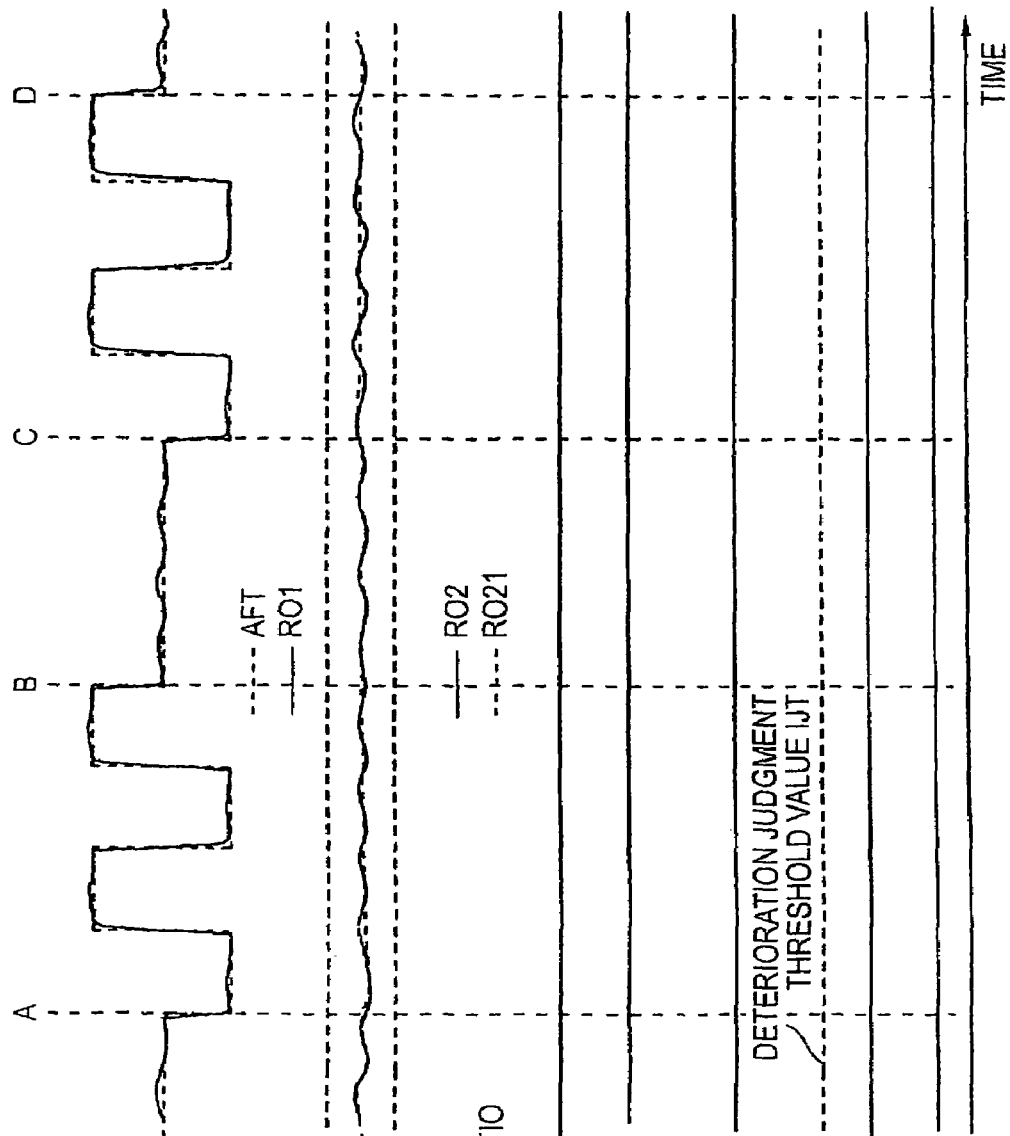

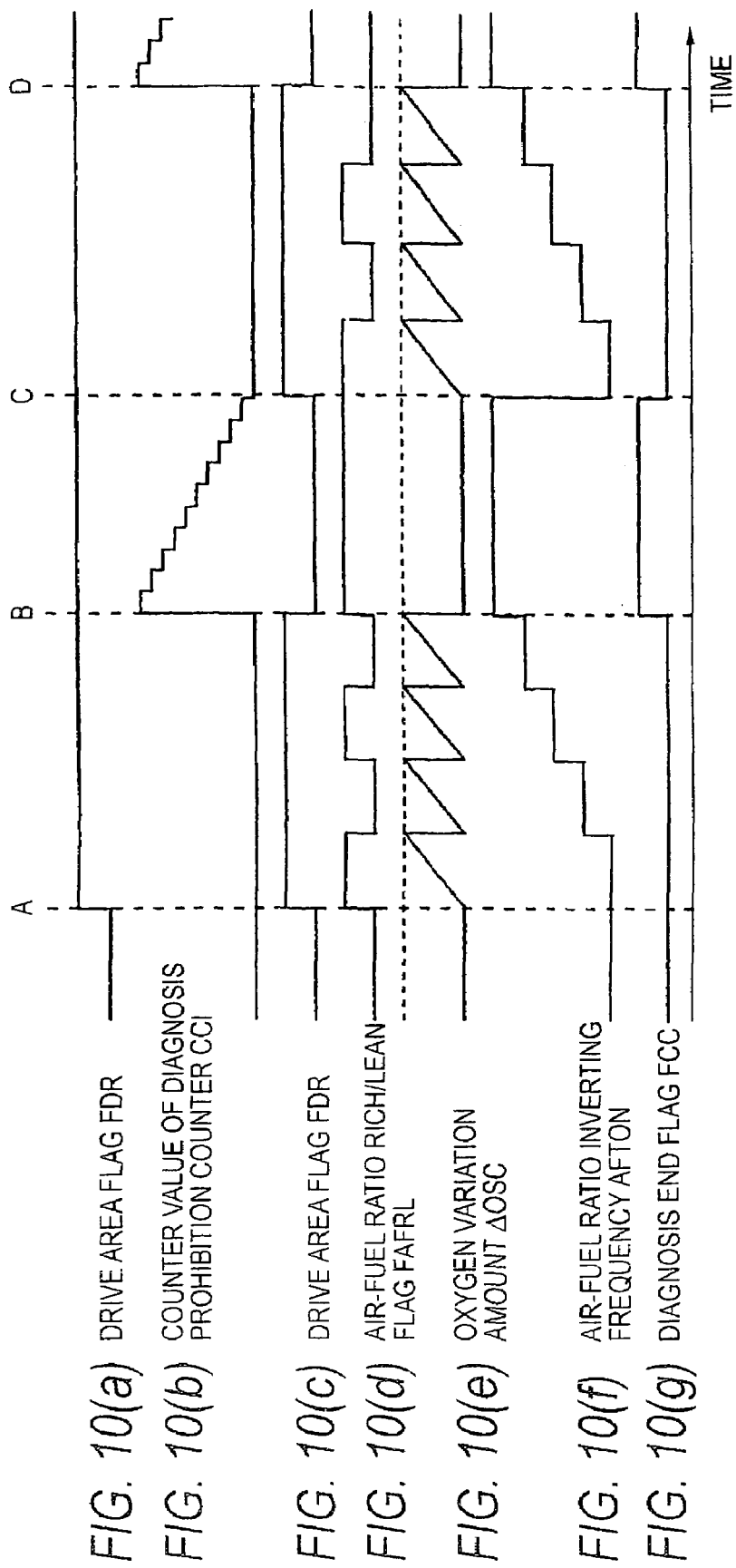

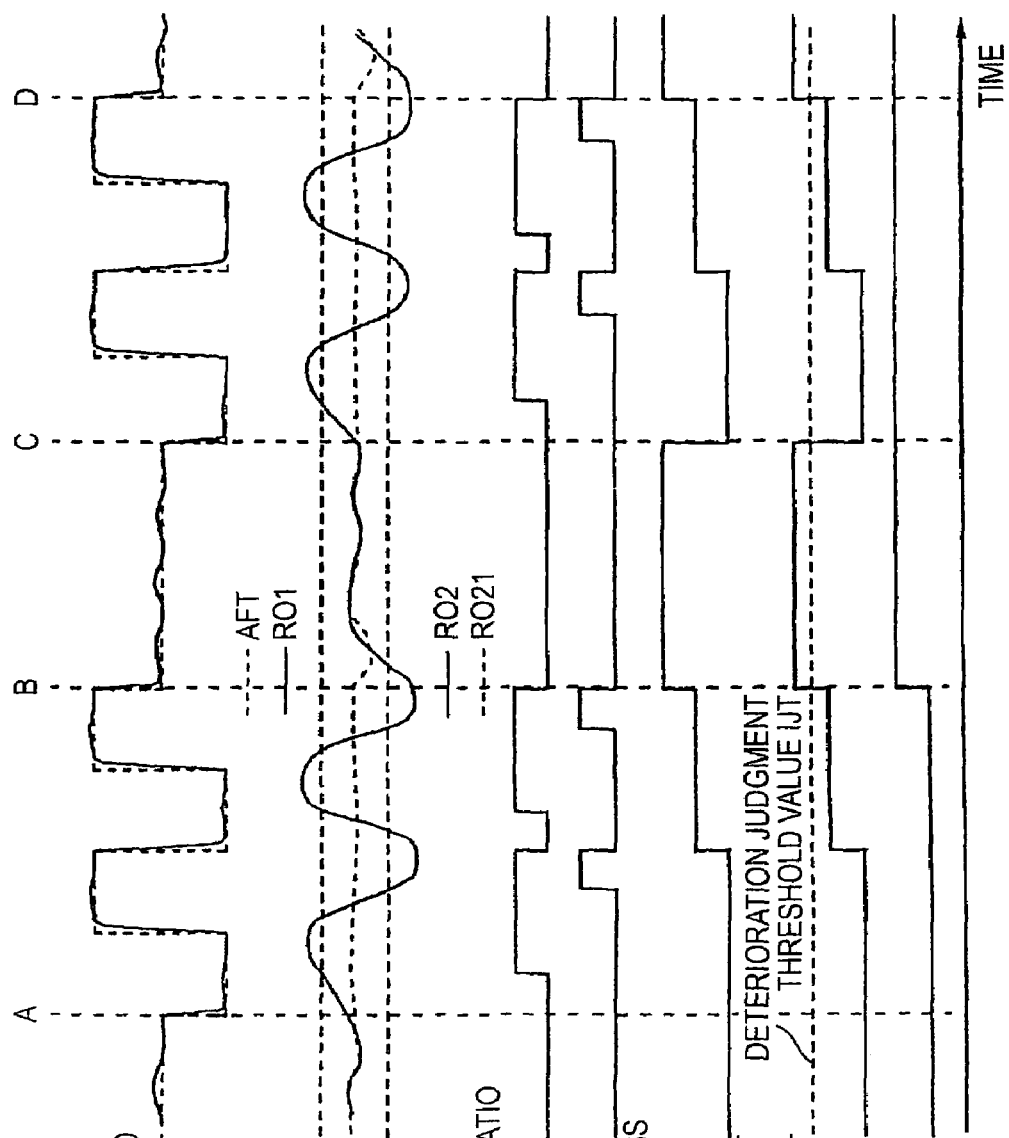

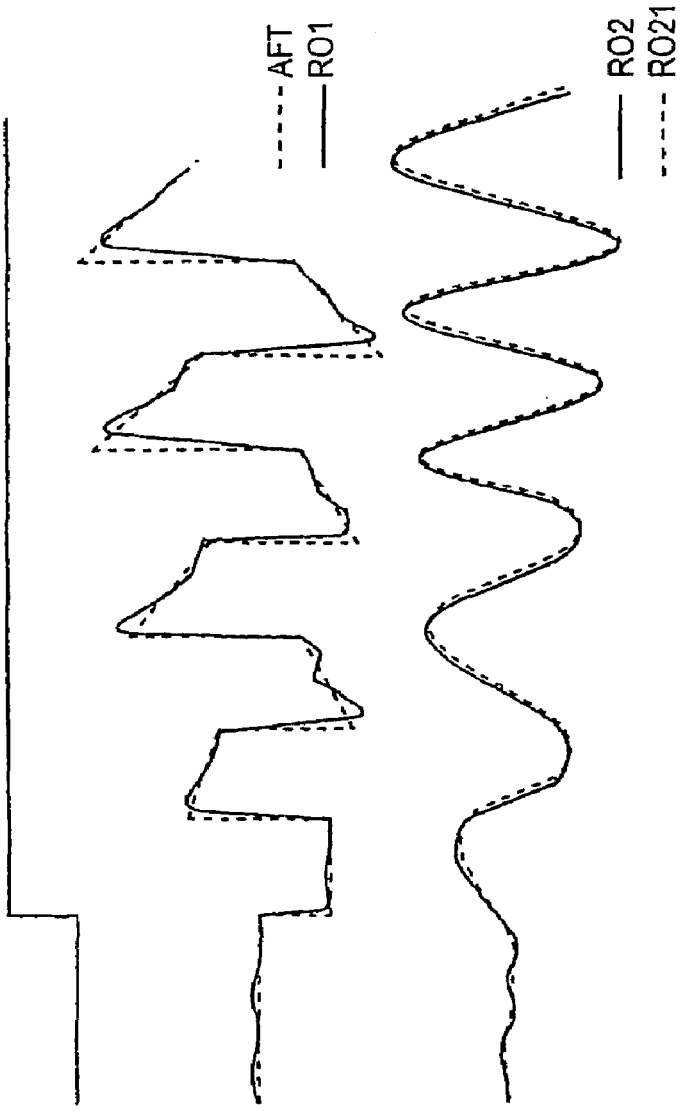
FIG. 11(c) DIAGNOSIS PERMISSION FLAG FCA
FIG. 11(h) UPSTREAM AIR-FUEL RATIO DETECTION OUTPUT RO1
FIG. 11(i) DOWNSTREAM AIR-FUEL RATIO DETECTION OUTPUT RO2

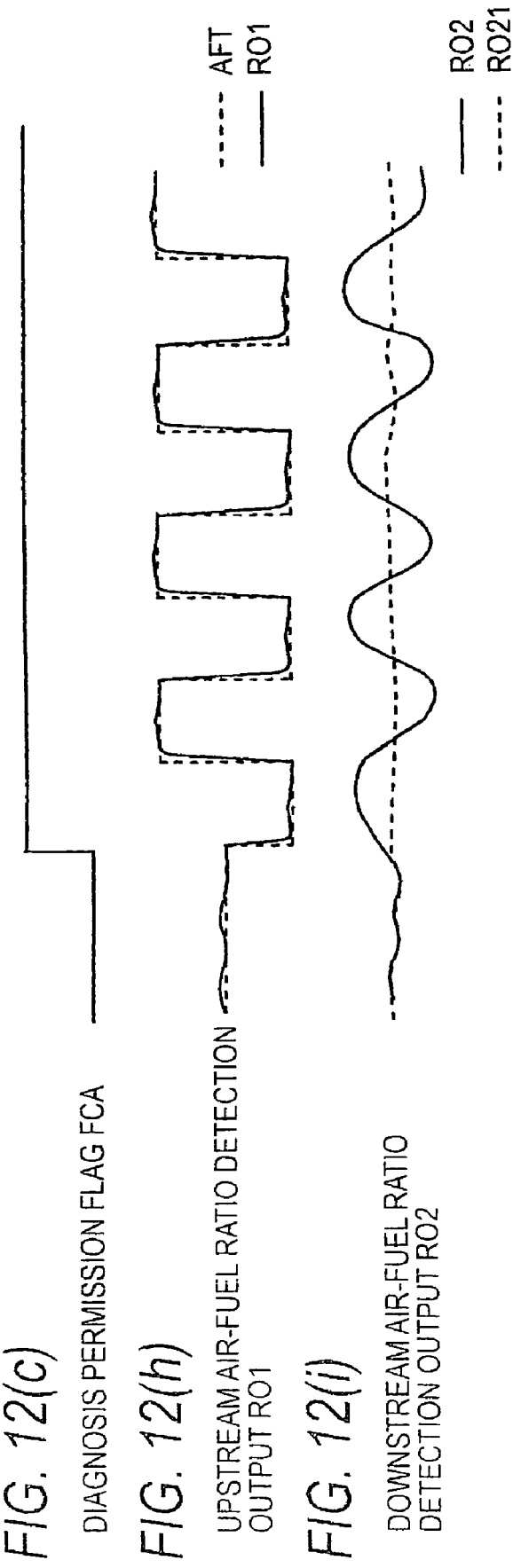

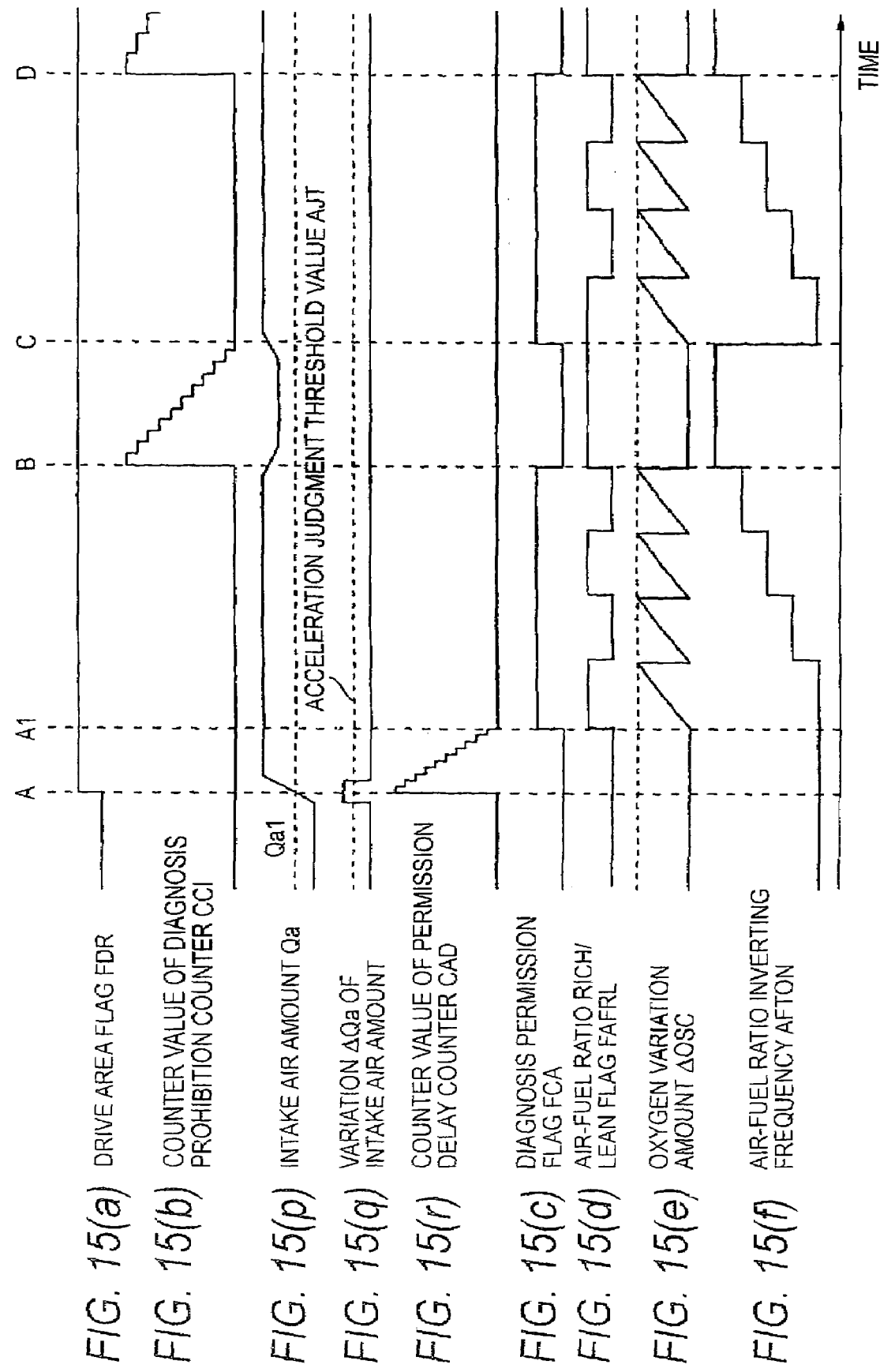

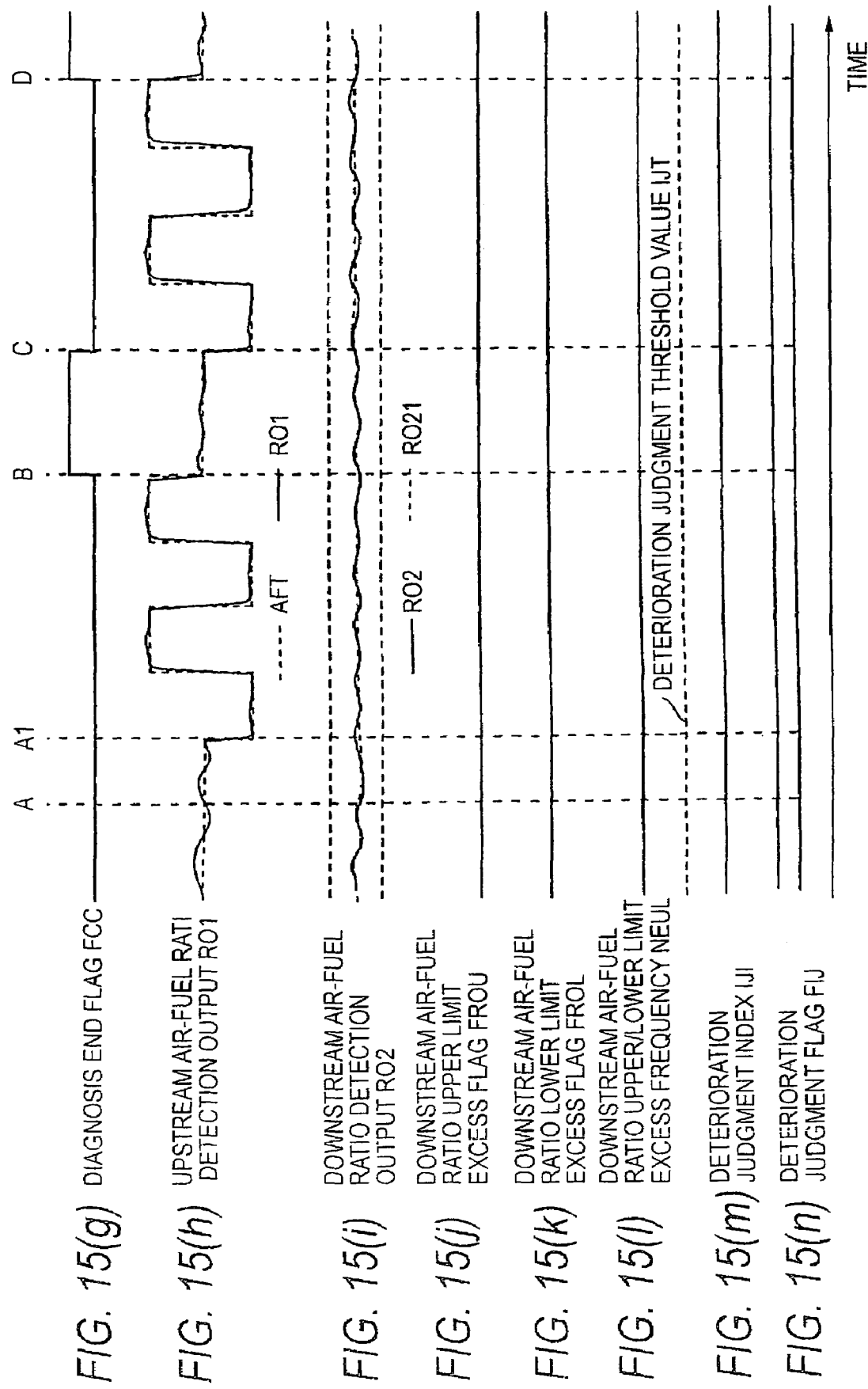

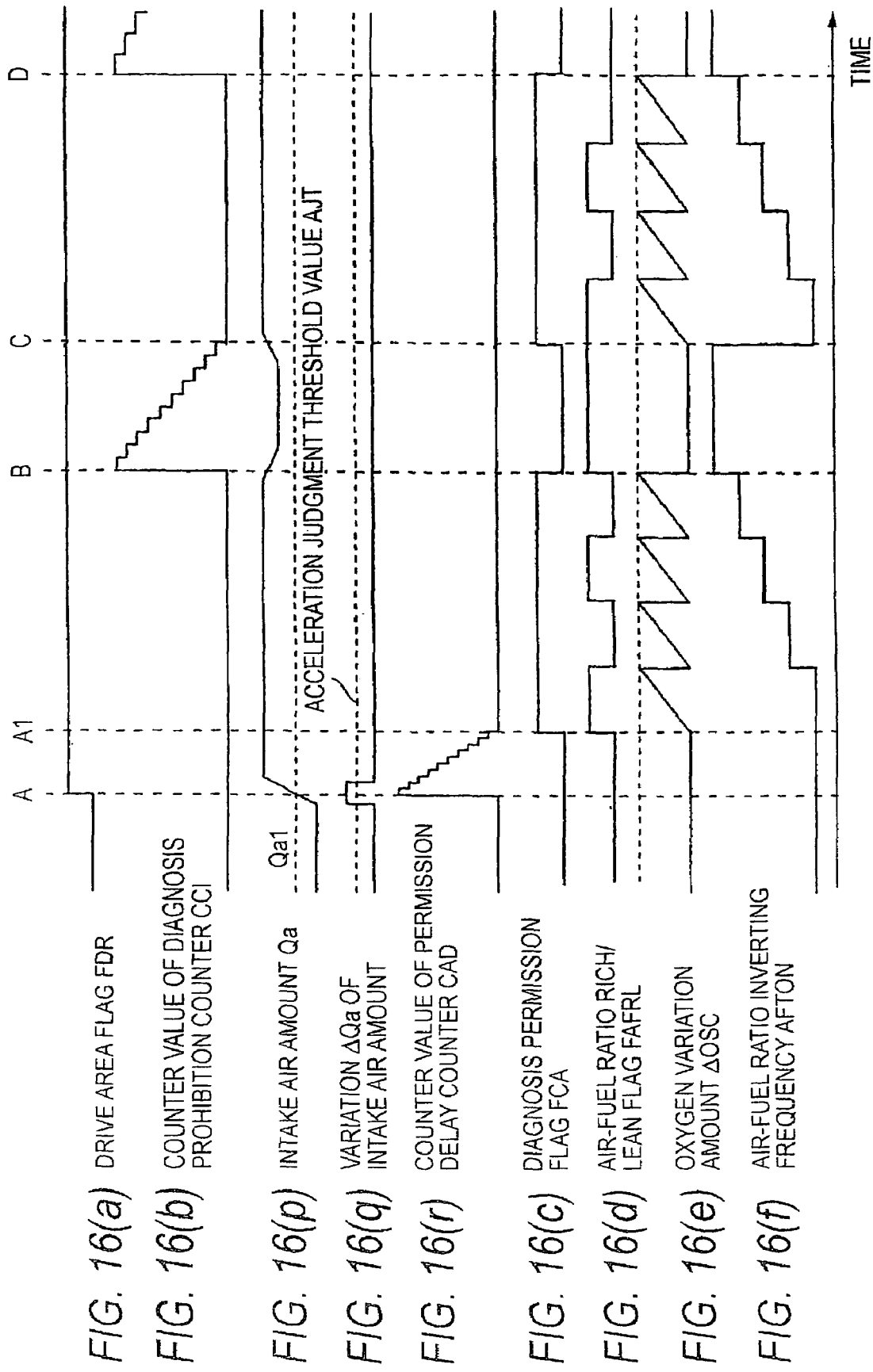

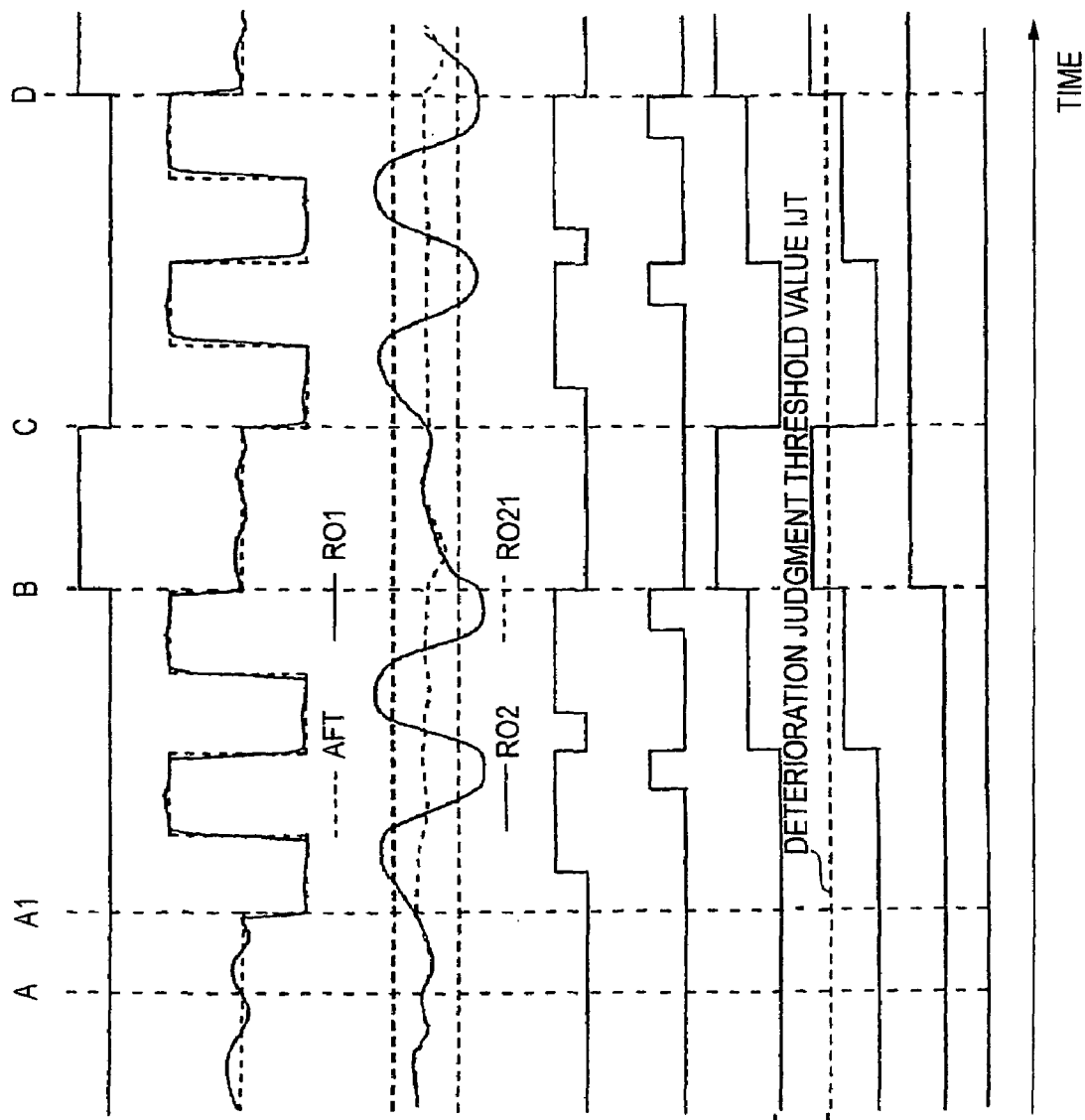

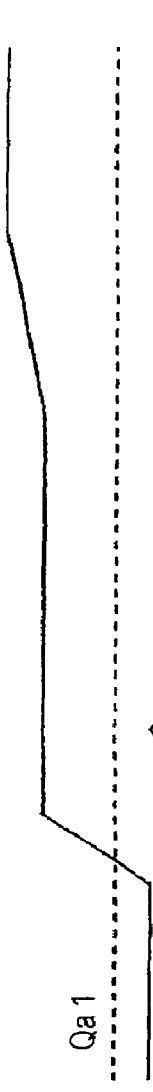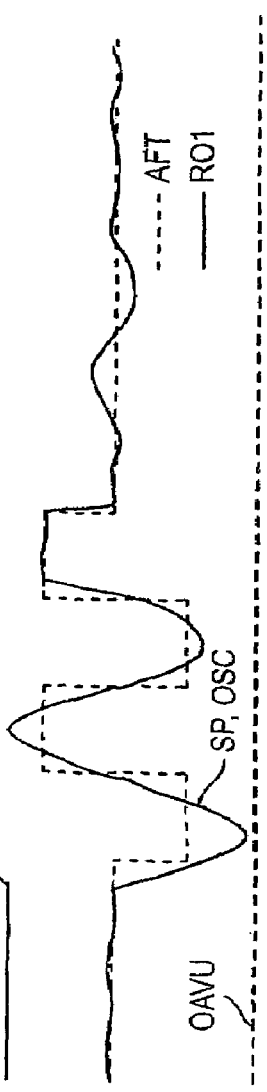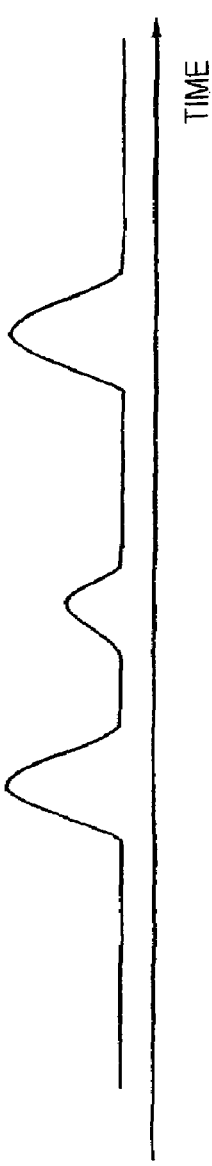
FIG. 17(a) INTAKE AIR AMOUNT Qa
FIG. 17(b) UPSTREAM AIR-FUEL RATIO DETECTION OUTPUT RO1
FIG. 17(c) IN-CATALYST OXYGEN ADSORPTION AMOUNT OAV
FIG. 17(d) DOWNSTREAM AIR-FUEL RATIO DETECTION OUTPUT RO2
FIG. 17(e) CO EXHAUST AMOUNT

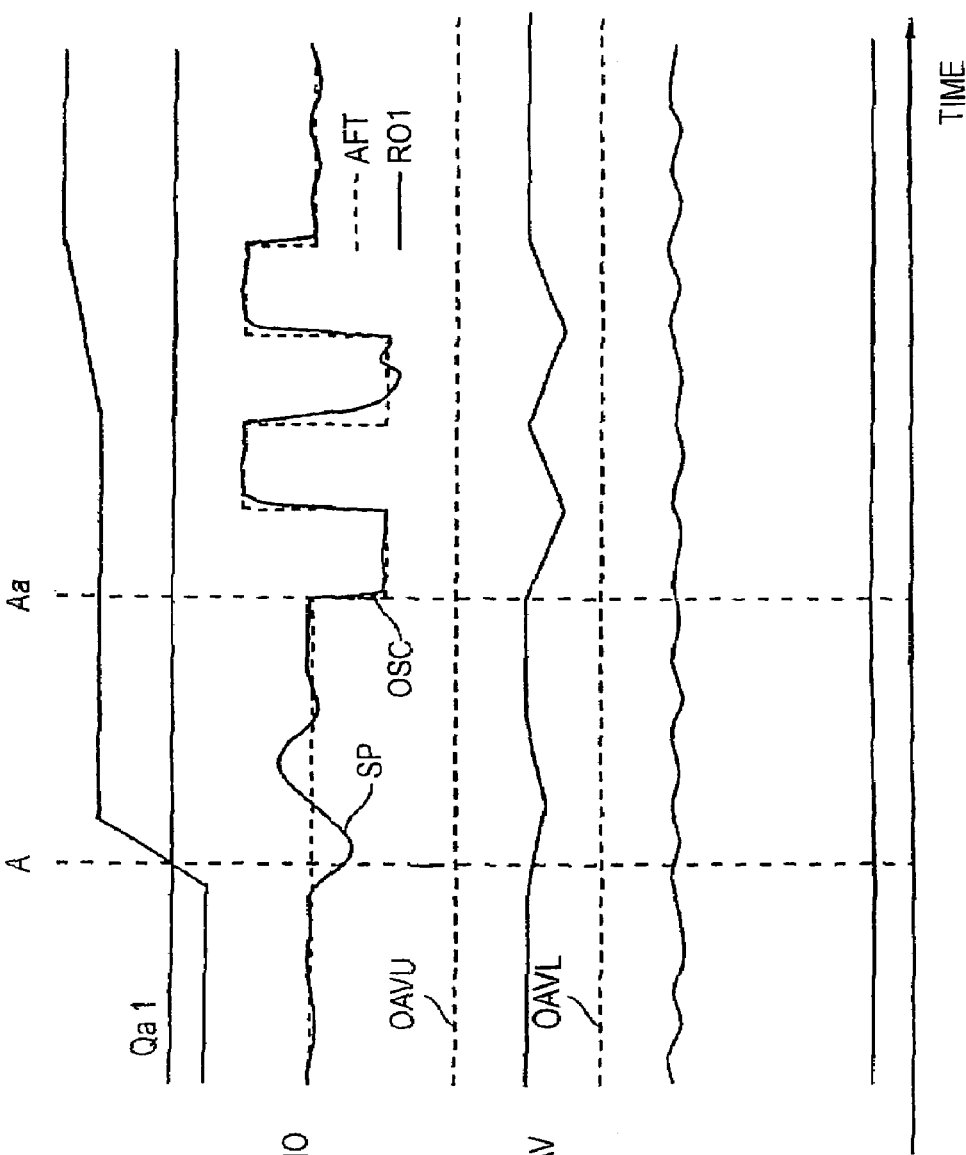

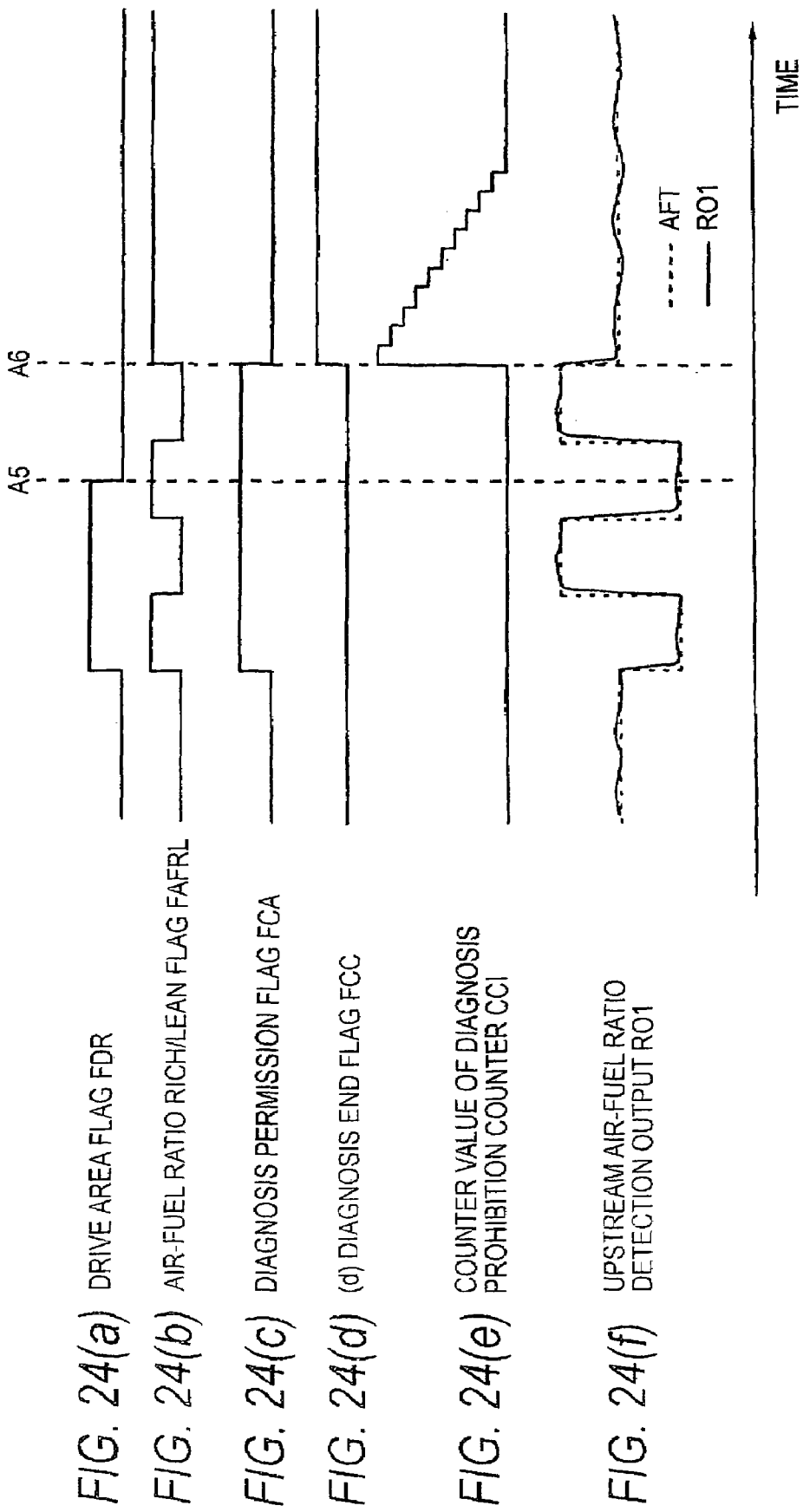

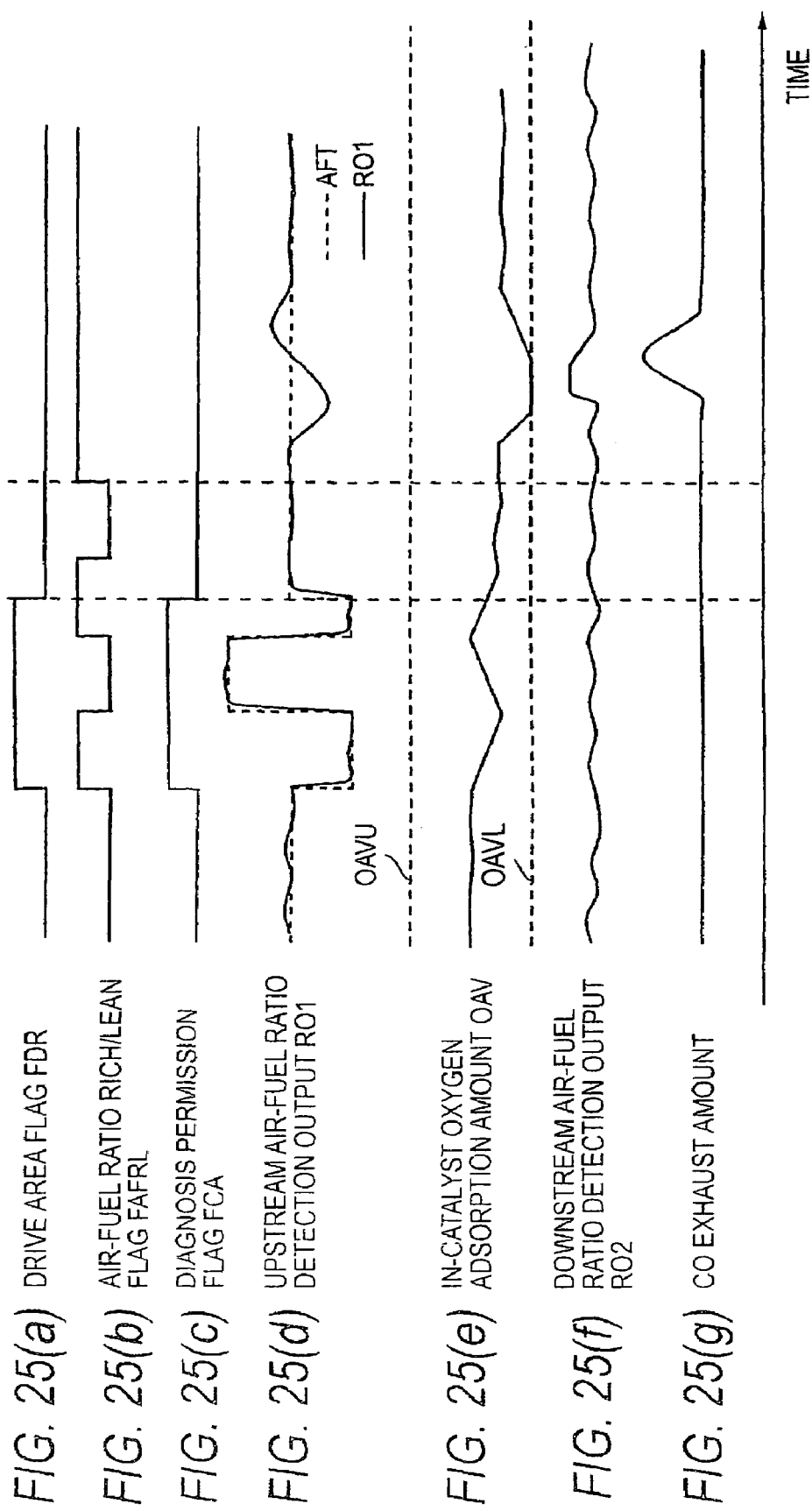

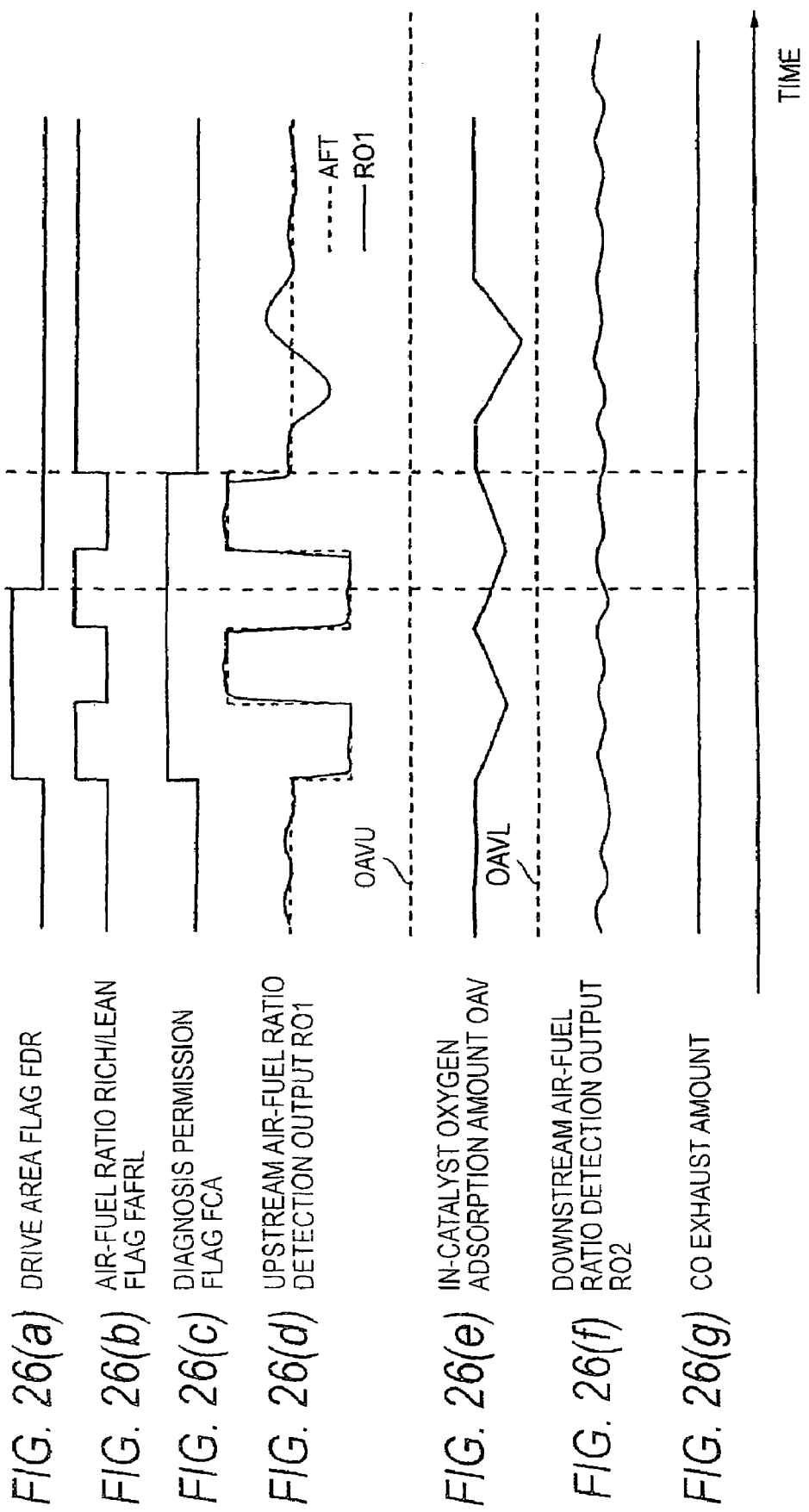

TIME

AIR-FUEL RATIO FEEDBACK CONTROL DEVICE

BACKGROUND OF THE INVENTION

1. Field of the Invention

The present invention relates to an air-fuel ratio feedback control device used in a fuel injection system for an internal combustion engine for a vehicle, for example, and more to an air-fuel ratio control device having a dual feedback control system using an upstream air-fuel ratio sensor disposed at the upstream side of catalyst disposed in an exhaust system of an internal combustion engine and a downstream air-fuel ratio sensor disposed at the downstream side of the catalyst.

2. Background of the Invention

In an internal combustion engine, three-way catalyst containing noble metal such as platinum, rhodium, palladium or the like is disposed in the exhaust system in order to convert harmful gas contained in exhaust gas, that is, hydrocarbon gas (HC gas), carbon monoxide gas (CO gas) and nitrogen oxide gas (NOx gas) to harmless gas and purify the exhaust gas. This catalyst has a high purifying action in the neighborhood of a theoretical air-fuel ratio, and if it is deviated from the theoretical air-fuel ratio, the purifying action is remarkably lowered. In order to make this catalyst keep its high purifying action, an air-fuel ratio feedback control device having a dual air-fuel ratio feedback control system is used.

According to the air-fuel ratio feedback control device having the dual air-fuel ratio feedback control system, feedback control is carried out on a fuel injection valve to control the fuel injection amount and keeps the catalyst under the high purifying action state. The dual air-fuel ratio feedback control system contains an upstream air-fuel ratio sensor disposed at the upstream side of the catalyst and a downstream air-fuel ratio sensor disposed at the downstream side of the catalyst, and controls the upstream air-fuel ratio at the upstream side of the catalyst to a target upstream air-fuel ratio so that the downstream air-fuel ratio at the downstream side of the catalyst is equal to a theoretical air-fuel ratio.

Not only noble metal, but also ceria is contained in the three-way catalyst. Ceria has a characteristic that it adsorbs oxygen when the air-fuel ratio is leaner than the theoretical air-fuel ratio and discharges thus-adsorbed oxygen when the air-fuel ratio is richer than the theoretical air-fuel ratio. Accordingly, the three-way catalyst has such an action that the theoretical air-fuel ratio is kept in the three-way catalyst even when the air-fuel ratio of exhaust gas flowing into the three-way catalyst varies. Even when the upstream air-fuel ratio of the catalyst is varied due to acceleration/deceleration of the internal combustion engine or the like, the theoretical air-fuel ratio would be kept in the catalyst if the variation of the upstream air-fuel ratio is within a variation range which can be absorbed by ceria. Therefore, the catalyst keeps high purifying action and the downstream air-fuel ratio is kept to the theoretical air-fuel ratio.

When the three-way catalyst is a new article, the adsorption capability of ceria for oxygen is high, and even when a periodical air-fuel ratio variation is applied to the upstream side of the catalyst as shown in FIG. 27A, the downstream air-fuel ratio of the catalyst is not varied as shown in FIG. 27B and it is kept to the theoretical air-fuel ratio. However, when accident fire or the like occurs in the internal combustion engine and thus the catalyst is exposed to extremely high temperature and thus deteriorated, the oxygen adsorbing capability of ceria is lowered and the purifying action of the catalyst on the exhaust gas is lowered. When the upstream air-fuel ratio of the deteriorated catalyst is varied as shown in FIG. 27A, the downstream air-fuel ratio is varied as shown in FIG. 27C in connection with the variation of the upstream air-fuel ratio.

In European and the United States, the amount of harmful gas contained in the exhaust gas of a vehicle is regulated and also the deterioration in performance of an emission system of harmful gas is regulated. The deterioration in performance of the emission system is called as OBD (On Board Diagnosis) regulation. According to this OBD regulation, it is obliged to detect the deterioration of the harmful gas emission system, and also it is obliged to detect the deterioration of catalyst in conjunction with the deterioration of the harmful gas emission system. In the OBD regulation, it is obliged that when the deterioration of the catalyst progresses until the amount of the harmful gas contained in the exhaust gas exceeds an OBD regulation value shown in FIG. 28, MIL (Malfunction Indicator Light) is turned on to inform this fact to a driver.

FIG. 28 shows the relationship between the oxygen adsorption capability of the catalyst and the gas amounts of non-methane hydrocarbon gas (NMHC gas) and nitrogen oxide gas (NOx gas) which are harmful components of the exhaust gas.

JP-A-11-270332 as a related art discloses the following method. That is, a linear air-fuel ratio sensor that can linearly detect an upstream air-fuel ratio is provided at the upstream side of the three-way catalyst, and a λ sensor whose output varies greatly in the neighborhood of the theoretical air-fuel ratio of the downstream side of the catalyst is provided. When the internal combustion engine is under a driving state which is suitable for deterioration diagnosis of the catalyst, the upstream air-fuel ratio is varied, an oxygen variation amount is applied to the three-way catalyst, and on the basis of the behavior of the output of the λ sensor at this time, the catalyst deterioration is judged. According to this method, the oxygen variation amount is set to the oxygen adsorption capability a corresponding to an OBD regulation value of FIG. 28. When the oxygen adsorption capability of the catalyst is larger than the given oxygen variation amount, the oxygen variation amount is absorbed and the output of the λ sensor is stabilized. However, when the catalyst deterioration progresses and the oxygen adsorption capability of the catalyst is smaller than the given oxygen variation amount, the oxygen variation amount is not absorbed and thus the output of the λ sensor is greatly varied, so that the deterioration of the catalyst can be judged.

According to the disclosure of JP-A-10-54225 as another related art, when rapid acceleration is applied to an internal combustion engine during deterioration diagnosis of catalyst, the variation of the air-fuel ratio is larger. Therefore, when the load variation in the internal combustion engine during the deterioration diagnosis of the catalyst exceeds a predetermined threshold value, the deterioration diagnosis of the catalyst is ceased.

In the air-fuel ratio feedback control device having this type of dual feedback control system as described above, a downstream air-fuel ratio feedback amount is calculated by downstream air-fuel ratio feedback control means, and an upstream target air-fuel ratio is calculated on the basis of the downstream air-fuel ratio feedback amount. In this air-fuel ratio feedback control device, the deterioration diagnosis of the catalyst is carried out by varying the upstream target air-fuel ratio. However, this air-fuel ratio feedback control device has a disadvantage that when the deterioration diagnosis of the catalyst is continuously carried out, the harmful gas purifying function of the catalyst is lowered.

SUMMARY OF THE INVENTION

Therefore, an object of the present invention is to provide an air-fuel ratio feedback control device improved so as to overcome the above disadvantage.

In order to attain the above object, an air-fuel ratio feedback control device for use in a fuel injection control system for controlling a fuel injection amount for an internal combustion engine comprises: a downstream air-fuel ratio sensor, a downstream air-fuel ratio feedback control means, an upstream air-fuel ratio sensor, an upstream air-fuel ratio feedback control means, and a catalyst deterioration diagnosing means. The downstream air-fuel ratio sensor is disposed at the downstream side of a catalyst set in an exhaust system of an internal combustion engine and outputs a downstream air-fuel ratio detection output. The downstream air-fuel ratio feedback control means calculates a downstream air-fuel ratio feedback amount on the basis of the downstream air-fuel ratio detection output and a target downstream air-fuel ratio. The upstream air-fuel ratio sensor is disposed at the upstream side of the catalyst and outputs the upstream air-fuel ratio detection output. The upstream air-fuel ratio feedback control means controls a correction amount to the fuel injection amount on the basis of at least the upstream air-fuel ratio detection output and a target upstream air-fuel ratio calculated by using the downstream air-fuel ratio feedback amount. The catalyst deterioration diagnosing means carries out deterioration diagnosis of the catalyst. The catalyst deterioration diagnosing means has a diagnosis permission judging means for judging permission of the deterioration diagnosis of the catalyst on the basis of a driving area of the internal combustion engine, an air-fuel ratio varying means for varying the target upstream air-fuel ratio at the catalyst deterioration diagnosis time, a catalyst deterioration judging means for judging the deterioration of the catalyst on the basis of the downstream air-fuel ratio detection output at the catalyst deterioration diagnosis time, and a catalyst deterioration diagnosis prohibiting means for setting a deterioration diagnosis prohibition time for the catalyst after the catalyst deterioration diagnosis.

According to the air-fuel ratio feedback control device of the present invention, the catalyst deterioration diagnosing means has the diagnosis permission judging means for judging the permission of the catalyst deterioration diagnosis on the basis of the driving area of the internal combustion engine, the air-fuel ratio varying means for varying the target upstream air-fuel ratio at the catalyst deterioration diagnosis, the catalyst deterioration judging means for judging the deterioration of the catalyst on the basis of the downstream air-fuel ratio at the catalyst deterioration diagnosis time, and the catalyst deterioration diagnosis prohibiting means for setting the catalyst deterioration diagnosis prohibition time after the catalyst deterioration diagnosis. After the catalyst deterioration diagnosis, the deterioration diagnosis prohibition time for the catalyst is set. Therefore, for the deterioration diagnosis prohibition time, the catalyst deterioration diagnosis is prohibited, and the harmful gas purifying function of the catalyst is restored, thereby preventing the harmful gas purification function of the catalyst from lessening.

The foregoing and other objects, features, aspects, and advantages of the present invention will be become more apparent from the following detailed description of the present invention when taken in conjunction with the accompanying drawings.

BRIEF DESCRIPTION OF THE DRAWINGS

FIGS. 9($a$)-($n$) are time charts showing the behavior of each parameter at the catalyst deterioration diagnosis time of the first embodiment when the catalyst is not deteriorated;

FIGS. 10($a$)-($n$) are time charts showing the behavior of each parameter at the catalyst deterioration diagnosis time of the first embodiment when the catalyst is deteriorated;

FIGS. 11($c$)($h$)($i$) are time charts showing the behavior of some parameters of the first embodiment when the catalyst is deteriorated;

FIGS. 12($c$)($h$)($i$) are time charts showing the behavior of some parameters of the first embodiment when the catalyst is deteriorated;

FIGS. 15($a$)-($n$), ($p$)-($r$) are time charts showing the behavior of each parameter at the catalyst deterioration diagnosis time of the second embodiment when the catalyst is not deteriorated;

FIGS. 16($a$)-($n$), ($p$)-($r$) are time charts showing the behavior of each parameter at the catalyst deterioration diagnosis time of the second embodiment when the catalyst is deteriorated;

FIGS. 17($a$)-($e$) are time charts showing the behavior of some parameters at the catalyst deterioration diagnosis time when the internal combustion engine is rapidly accelerated;

FIGS. 18($a$)-($e$) are time charts showing the behavior of some parameters at the catalyst deterioration diagnosis time when the internal combustion engine is rapidly accelerated in the second embodiment;

FIGS. 24(a)-(f) are time charts showing the behavior of some parameters at the catalyst deterioration diagnosis time according to the fourth embodiment;

FIGS. 25(a)-(g) are time charts showing the behavior of some parameters at the catalyst deterioration diagnosis time when the driving area becomes improper to the catalyst deterioration diagnosis during the air-fuel ratio variation cycle;

FIGS. 26(a)-(g) are time charts showing the behavior of some parameters at the catalyst deterioration diagnosis time when the driving area becomes improper to the catalyst deterioration diagnosis during the air-fuel ratio variation cycle according to the fourth embodiment;

DETAILED DESCRIPTION OF THE PREFERRED EMBODIMENTS

Preferred embodiments according to the present invention will be described with reference to the accompanying drawings.

First Embodiment

Figure 1:
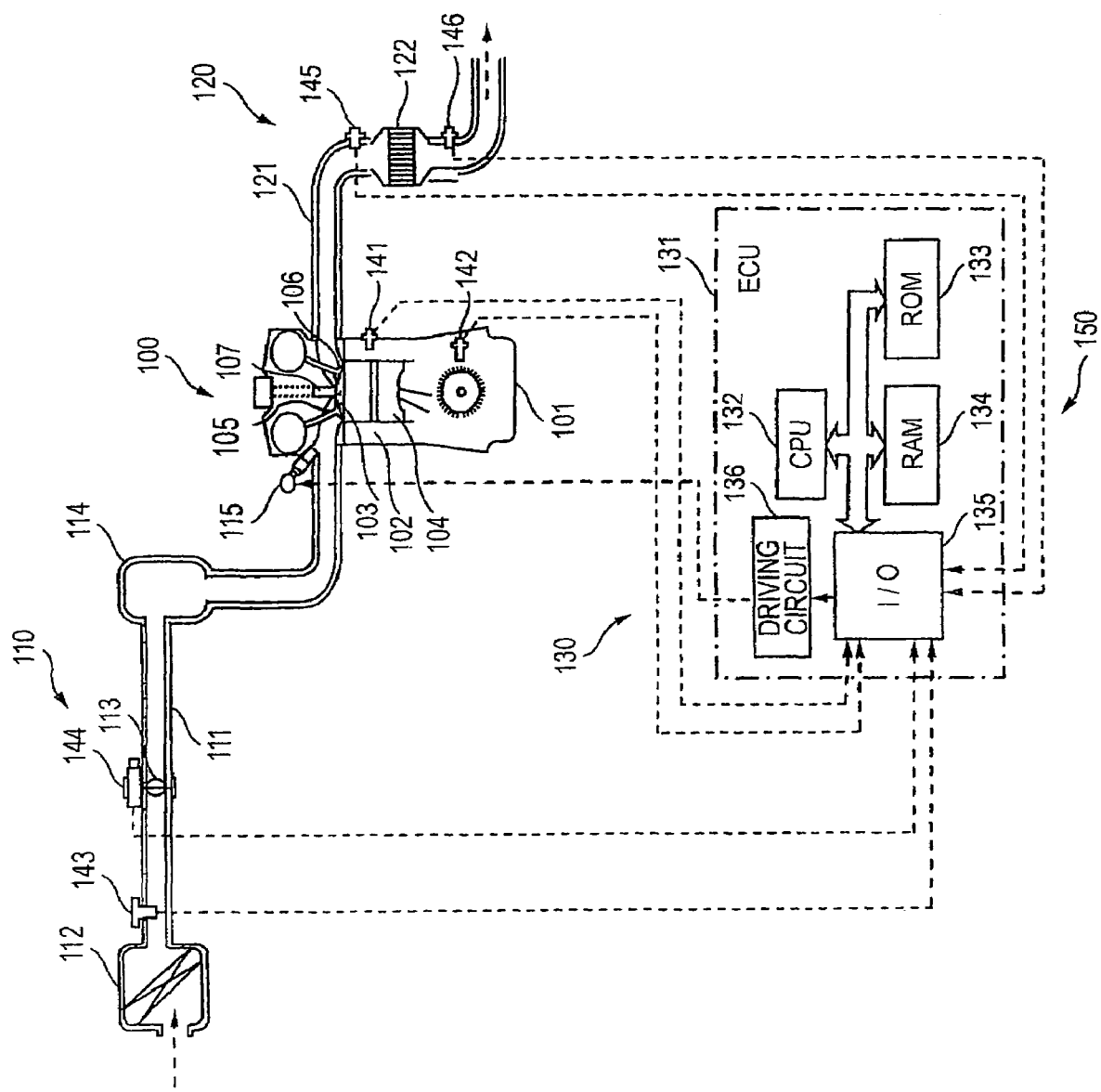
FIG. 1 shows an internal combustion engine having a fuel injection control system containing an air-fuel ratio feedback control device according to the present invention.

FIG. 1 is a diagram showing an internal combustion engine having a fuel injection control system for the internal combustion engine which uses an air-fuel ratio feedback control device according to the present invention.

In FIG. 1, the internal combustion engine 100 is equipped with a fuel injection control system 130. The internal combustion engine 100 is mounted in various kinds of vehicles, and it has the main body 101 of the internal combustion engine, an intake system 110 and an exhaust system 120. The internal combustion engine main body 101 has a cylinder 102, a combustion chamber 103, a piston 104, an intake valve 105, an exhaust valve 106 and an ignition plug 107. The piston 104 is engagedly fitted in the cylinder 102 so that it can make a reciprocating motion. When air-fuel mixture in the combustion chamber 103 is ignited by the ignition plug 107, the piston 104 reciprocates in the cylinder 102. The intake valve 105 and the exhaust valve 106 are opened/closed in synchronism with the piston 104. The intake valve 105 is opened/closed to permit/intercept the air intake from the intake system 110 to the combustion chamber 103. The exhaust valve 106 is opened/closed to permit/intercept the exhaust from the combustion chamber 103 to the exhaust system 120.

The intake system 110 has an intake pipe 111, an air cleaner 112, a throttle valve 113, a surge tank 114 and a fuel injection valve 115. The throttle valve 113 is disposed in the intake pipe 111 between the surge tank 114 and the air cleaner 112, and controls the intake air amount on the basis of the variation of the valve opening degree thereof. The fuel injection valve 115 is disposed so as to inject fuel into an intake port near to the intake valve 105. The fuel injection valve 115 injects fuel such as gasoline or the like to intake air to achieve air-fuel mixture. The amount of fuel injected by the fuel injection valve 115 is controlled in accordance with the intake air amount so that the air-fuel ratio of the air-fuel mixture is equal to a theoretical air-fuel ratio.

The exhaust system 120 has an exhaust pipe 121 and catalyst 122 disposed in the exhaust pipe 121. The catalyst 122 is three-way catalyst containing noble metal such as platinum, rhodium, palladium or the like. The catalyst 122 promotes oxidation of harmful gas contained in exhaust gas such as hydrocarbon gas (HC gas), carbon monoxide gas (CO gas) and nitrogen oxide gas (NOX gas) by the noble metal, and converts the harmful gas to harmless gas, thereby purifying the exhaust gas. The catalyst 122 contains not only the noble metal, but also ceria. Ceria adsorbs oxygen when the air-fuel ratio of the exhaust gas is leaner than the theoretical air-fuel ratio, and also discharges thus-adsorbed oxygen when the exhaust gas is richer than the theoretical air-fuel ratio.

The fuel injection control system 130 is mainly constructed by a control unit 131. The control unit 131 is constructed by a microcomputer, and it has CPU 132, a read-only memory (ROM) 133, a random access memory (RAM) 134, an input/output interface (I/O circuit) 135 and a driving circuit 136. CPU 132 is a central processing unit, and executes various kinds of operation processing by using RAM 134 according to programs stored in ROM 133. The I/O circuit 135 is connected to CPU 132, ROM 133 and RAM 134, and inputs signals to these elements and outputs signals from these elements. The driving circuit 136 is connected to the I/O circuit 134 to control the fuel injection valve 115 and control the timing of the fuel injection and the fuel injection amount.

The control unit 131 is connected to a water temperature sensor 141, a crank angle sensor 142, an air flow sensor 143, a throttle opening degree sensor 144, an upstream air-fuel ratio sensor 145 and a downstream air-fuel ratio sensor 146. The water temperature sensor 141 is disposed in the internal combustion engine main body 101, and detects the cooling water temperature Wt of the internal combustion engine main body 101. The crank angle sensor 142 is disposed in the internal combustion engine main body 101, and detects the crank angle of the internal combustion engine main body 101. The air flow sensor 143 is disposed in the intake pipe 111 at the outlet side of the air cleaner 112 to detect an intake air amount Qa. The throttle opening degree sensor 144 is provided in juxtaposition with the throttle valve 113 to detect the valve opening degree of the throttle valve 113.

The upstream air-fuel ratio sensor 145 is constructed by a linear sensor, and disposed in the exhaust pipe 121 at the upstream side of the catalyst 122. The downstream air-fuel ratio sensor 146 is constructed by a λ sensor, and disposed in the exhaust pipe 121 at the downstream side of the catalyst 122. The upstream air-fuel ratio sensor 145 outputs the upstream air-fuel ratio detection output RO1 corresponding to an upstream air-fuel ratio AF at the upstream side of the catalyst 122. The downstream air-fuel ratio sensor 146 outputs the downstream air-fuel ratio detection output RO2 corresponding to a downstream air-fuel ratio BF at the downstream side of the catalyst 122. The upstream air-fuel ratio sensor 145 and the downstream air-fuel ratio sensor 146 constitute the air-fuel ratio feedback control device 150 together with the control unit 131.

The control unit 131 calculates the fuel injection time Tw for the fuel injection valve 115. This fuel injection time Tw is given from the driving circuit 136 to the fuel injection valve 115. The fuel injection valve 115 injects fuel at the given fuel injection time Tw. The fuel amount injected from the fuel injection valve 115 is proportional to the fuel injection time Tw. The fuel injection time Tw is calculated according to the following equation (1).

$$Tw = Tb \times (1 + Cfb + Cetc) + Td \quad (1)$$

In the equation (1), Tb represents the basic injection time of the fuel injection valve 115, Td represents a waste time, Cfc represents an upstream air-fuel ratio feedback correction amount and Cetc represents another correction amount.

The basic injection time Tb is calculated by multiplying the intake air flow amount per stroke of the piston 104 (Qa/Ne) by a preset conversion gain such that the air-fuel mixture sucked in the combustion chamber 103 is equal to the theoretical air-fuel ratio. Qa represents an intake air amount detected by the air flow sensor 143, and Ne represents the rotational number of the internal combustion engine 100 calculated on the basis of the output of the crank angle sensor 142. The waste time Td is added to the equation (1) in order to correct a waste time T for which no fuel is effectively injected even when the fuel injection valve 115 is driven. The upstream air-fuel ratio feedback correction amount Cfc is a correction amount based on the air-fuel ratio feedback control device 150. The other correction amount Cetc increases the fuel injection amount and stabilizes combustion with the air-fuel mixture being rich, for example when the cooling water temperature Wt of the internal combustion engine main body 101 detected by the water temperature sensor 141 is low.

The fuel injection control system 130 has an air-fuel ratio feedback control device 150, and the air-fuel ratio feedback control device 150 contains the control unit 131, the upstream air-fuel ratio sensor 145 and the downstream air-fuel ratio sensor 146.

Figure 2:
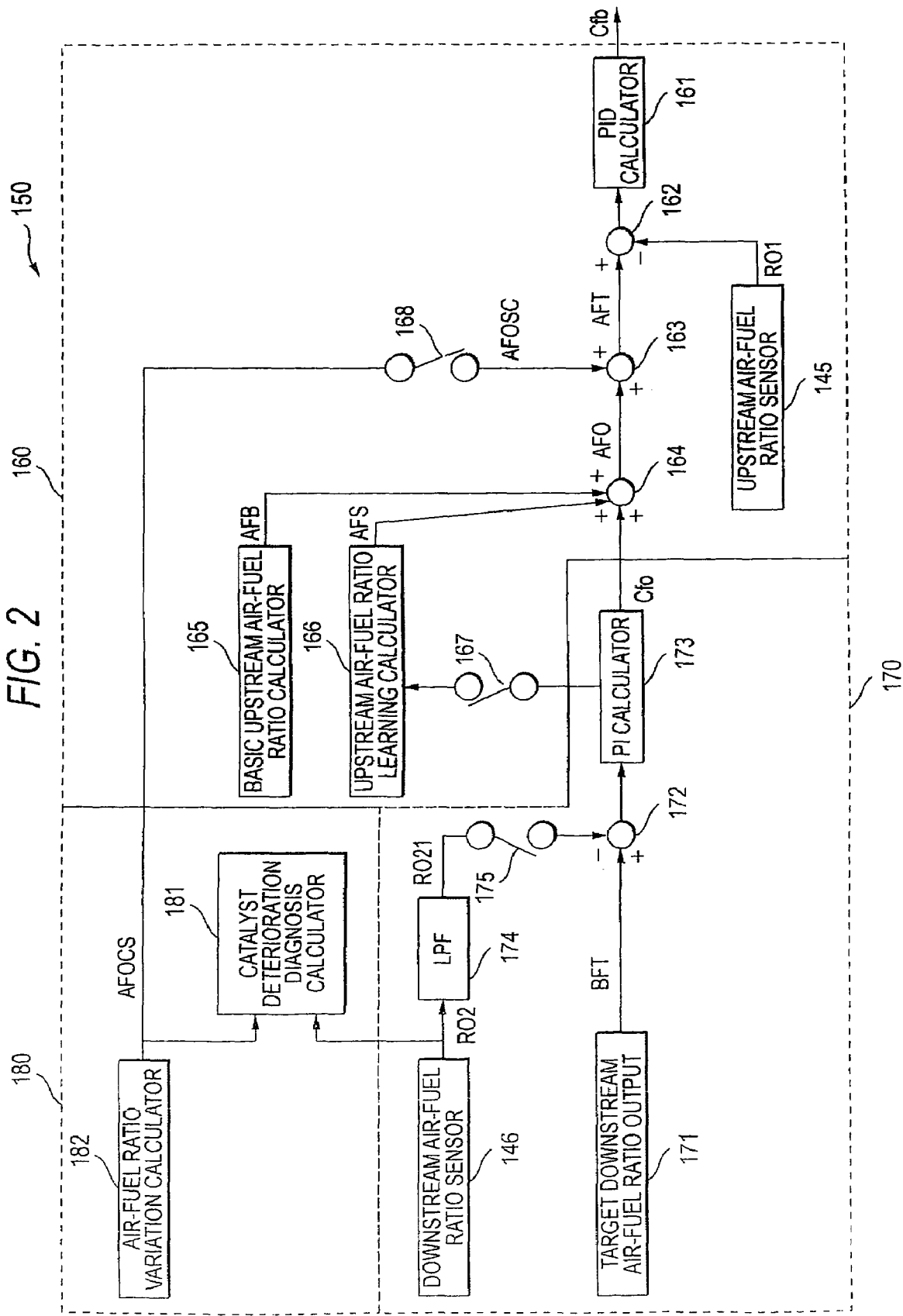
FIG. 2 is a block diagram showing a first embodiment of the air-fuel ratio feedback control device of the present invention.

FIG. 2 is a block diagram showing the details of the air-fuel ratio feedback control device 150 according to the first embodiment. The air-fuel ratio feedback control device 150 contains an upstream air-fuel ratio feedback control means 160, a downstream air-fuel ratio feedback control means 170 and a catalyst deterioration diagnosing means 180. The upstream air-fuel ratio feedback control means 160 and the downstream air-fuel ratio feedback control means 170 constitute a dual feedback control system. The catalyst deterioration diagnosing means 180 carries out deterioration diagnosis of the catalyst 122.

The upstream air-fuel ratio feedback control means 160 calculates and outputs the upstream air-fuel ratio feedback correction amount Cfb. The upstream air-fuel ratio feedback control means 160 contains a PID calculating means 161, an upstream calculating means 162, a target upstream air-fuel ratio calculating means 163, a basic upstream target air-fuel ratio calculating means 164, a basic upstream air-fuel ratio calculating means 165, an upstream air-fuel ratio learning calculating means 166, a leaning calculation control switching means 167, a variation calculation output control switching means 168, and an upstream air-fuel ratio sensor 145. The PID calculating means 161, the upstream calculating means 162, the target upstream air-fuel ratio calculating means 163, the basic upstream target air-fuel ratio calculating means 164, the basic upstream air-fuel ratio calculating means 165, the upstream air-fuel ratio learning calculating means 166, the leaning calculation control switching means 167 and the variation calculation output control switching means 168 are executed by the control unit 131.

The upstream calculating means 162 is supplied with the target upstream air-fuel ratio AFT from the target upstream air-fuel ratio calculating means 163 and the upstream air-fuel ratio detection output RO1 from the upstream air-fuel ratio sensor 145. The upstream calculating means 162 supplies the output corresponding to the difference (AFT−RO1) between the target upstream air-fuel ratio AFT and the upstream air-fuel ratio detection output RO1 to the PID calculating means 161. The PID calculating means 161 executes proportion calculation, integration calculation and differential calculation so that the output of the difference (AFT−RO1) is equal to zero, that is, the upstream air-fuel ratio detection output RO1 is coincident with the target upstream air-fuel ratio AFT, thereby calculating the upstream air-fuel ratio feedback correction amount Cfb. The upstream air-fuel ratio detection output RO1 can be made coincident with the target upstream air-fuel ratio AFT on the basis of the execution of the proportion calculation, the integration calculation and the differential calculation by the PID calculating means 161 even when there exist some dispersion in the fuel injection valve 115, the air flow sensor 143, etc., evaporation purge stocked in a canister and the air-fuel ratio disturbance due to master back when a driver puts on the brake.

The target upstream air-fuel ratio AFT is output from the target upstream air-fuel ratio calculating means 163. The target upstream air-fuel ratio calculating means 163 is supplied with a basic target upstream air-fuel ratio AFO from the basic upstream target air-fuel ratio calculating means 164 and an air-fuel ratio variation calculation output AFOSC. The target upstream air-fuel ratio calculating means 163 adds the basic target upstream air-fuel ratio AFO and the air-fuel ratio variation output AFOSC, and outputs the target upstream air-fuel ratio AFT. That is, AFT=AFO+AFOSC. The air-fuel ratio variation calculation output AFOSC is supplied from the catalysis deterioration diagnosing means 180 through the variation calculation output control switching means 168 to the target upstream air-fuel ratio calculating means 163. The variation calculation output control switch means 168 is turned on under the deterioration diagnosis operation state that the deterioration diagnosis of the catalyst 122 is carried out by the catalyst deterioration diagnosing means 180, and turned off under the other states. Accordingly, under the deterioration diagnosis state of the catalyst 122, the air-fuel ratio variation calculation output AFOSC is added to the target upstream air-fuel ratio AFO.

The basic upstream target air-fuel ratio calculating means 164 is supplied with a basic upstream air-fuel ratio AFB from the basic upstream air-fuel ratio calculating means 165, a downstream air-fuel ratio feedback amount Cf0 from the downstream air-fuel ratio feedback control means 170, and an upstream air-fuel ratio learning calculation output AFS from the upstream air-fuel ratio learning calculating means 166. The basic upstream target air-fuel ratio calculating means 164 adds the basic upstream air-fuel ratio AFB, the downstream air-fuel ratio feedback amount Cf0 and the upstream air-fuel ratio learning calculation output AFS, and outputs the basic target upstream air-fuel ratio AFO. That is, AFO=AFB+Cf0+AFS. In other words, the basic upstream air-fuel ratio AFB is corrected on the basis of the downstream air-fuel ratio feedback amount Cf0 and the upstream air-fuel ratio learning calculation output AFS, and the basic target upstream air-fuel ratio AFO is output.

The downstream air-fuel ratio feedback control means 170 has a target downstream air-fuel ratio output means 171, a downstream calculating means 172, a PI calculating means 173, a downstream air-fuel ratio sensor 146, a low pass filter 174 and a downstream air-fuel ratio detection output control switching means 175. The target downstream air-fuel ratio output means 171, the downstream calculating means 172, the PI calculating means 173, the low pass filter 174 and the downstream air-fuel ratio detection output control switching means 175 are executed by the control unit 131.

The target downstream air-fuel ratio output means 171 outputs a target downstream air-fuel ratio BFT stored in RAM 133 in advance. The target downstream air-fuel ratio BFT is set to a predetermined value, for example, 0.7(V) so that the purification rate of the harmful gas by the catalyst 122 is maximum. The downstream air-fuel ratio sensor 146 outputs the downstream air-fuel ratio detection output RO2. The low pass filter 174 subjects the downstream air-fuel ratio detection output RO2 to filter processing to average the downstream air-fuel ratio detection output RO2, and then outputs a downstream air-fuel ratio detection output RO21.

The downstream calculating means 172 is supplied with the target downstream air-fuel ratio BFT from the target downstream air-fuel ratio outputting means 171 and the downstream air-fuel ratio detection output RO21 from the low pass filter 174. The downstream air-fuel ratio detection output RO21 is supplied to the downstream calculating means 172 through the downstream air-fuel ratio detection output control switching means 175. The downstream air-fuel ratio detection output control switching means 175 is turned off when it is judged as a result of the catalyst deterioration diagnosis of the catalyst deterioration diagnosing means 180 that the catalyst 122 is deteriorated, and in other cases, it is turned on and the downstream air-fuel ratio detection output RO21 is supplied to the downstream calculating means 172.

The downstream calculating means 172 calculates the differential output (BFT−RO21) between the target downstream air-fuel ratio BFT and the downstream air-fuel ratio detection output RO21, and supplies the differential output (BFT−RO21) to the PI calculating means 173. The PI calculating means 173 carries out the proportion calculation and the integration calculation so that the downstream air-fuel ratio detection output RO21 is coincident with the target downstream air-fuel ratio BFT, calculates the downstream air-fuel ratio feedback amount Cf0 and supplies the downstream air-fuel ratio feedback amount Cf0 to the basic upstream target air-fuel ratio calculating means 164.

The upstream air-fuel ratio learning calculating means 166 is connected to the PI calculating means 173 through the learning calculation control switching means 167. The learning calculation control switching means 167 is turned off under the deterioration diagnosis operation state that the deterioration diagnosis of the catalyst 122 is carried out by the catalyst deterioration diagnosing means 180, and turned on under the other states. Under the state that the deterioration diagnosis of the catalyst 122 is not carried out, the learning calculation control switching means 167 is turned on, and the integration value of the PI calculating means 173 is gradually shifted to the upstream air-fuel ratio learning value of the upstream air-fuel ratio leaning calculating means 166. As a result, the upstream air-fuel ratio leaning calculating means 166 compensates for the dispersion of the catalyst 122 and the upstream air-fuel ration sensor 145 and the time-based deterioration and keeps the harmful gas purifying performance of the catalyst 122 to the maximum level.

The catalyst deterioration diagnosing means 180 contains a catalyst deterioration diagnosis calculating means 181 and an air-fuel ratio variation calculating means 182. The air-fuel ratio variation calculating means 182 calculates an air-fuel ratio variation output AFOSC for alternately varying the air-fuel ratio AF at the upstream side of the catalyst 122 between the rich and lean states with the theoretical air-fuel ratio set at the center of the variation. The air-fuel ratio variation output AFOSC is supplied through the air-fuel ratio variation output control switching means 168 to the upstream calculating means 163, and also supplied to the catalyst deterioration diagnosis calculating means 181. Under the deterioration diagnosis operation state that the deterioration diagnosis of the catalyst 122 is carried out by the catalyst deterioration diagnosing means 180, the air-fuel ratio variation output control switching means 168 is turned on. Therefore, the target upstream air-fuel ratio AFT is varied by the air-fuel ratio variation output AFOSC, and the upstream air-fuel ratio AF at the upstream side of the catalyst 122 is alternatively varied between the rich and lean states with the theoretical air-fuel ratio set at the center of the variation. The catalyst deterioration diagnosis calculating means 181 is supplied with the air-fuel ratio variation output AFOSC and the downstream air-fuel ratio detection output RO2 from the downstream air-fuel ratio sensor 146, and the deterioration diagnosis of the catalyst 122 is carried out on the basis of the behavior of the downstream air-fuel ratio detection output RO2.

Figure 3:
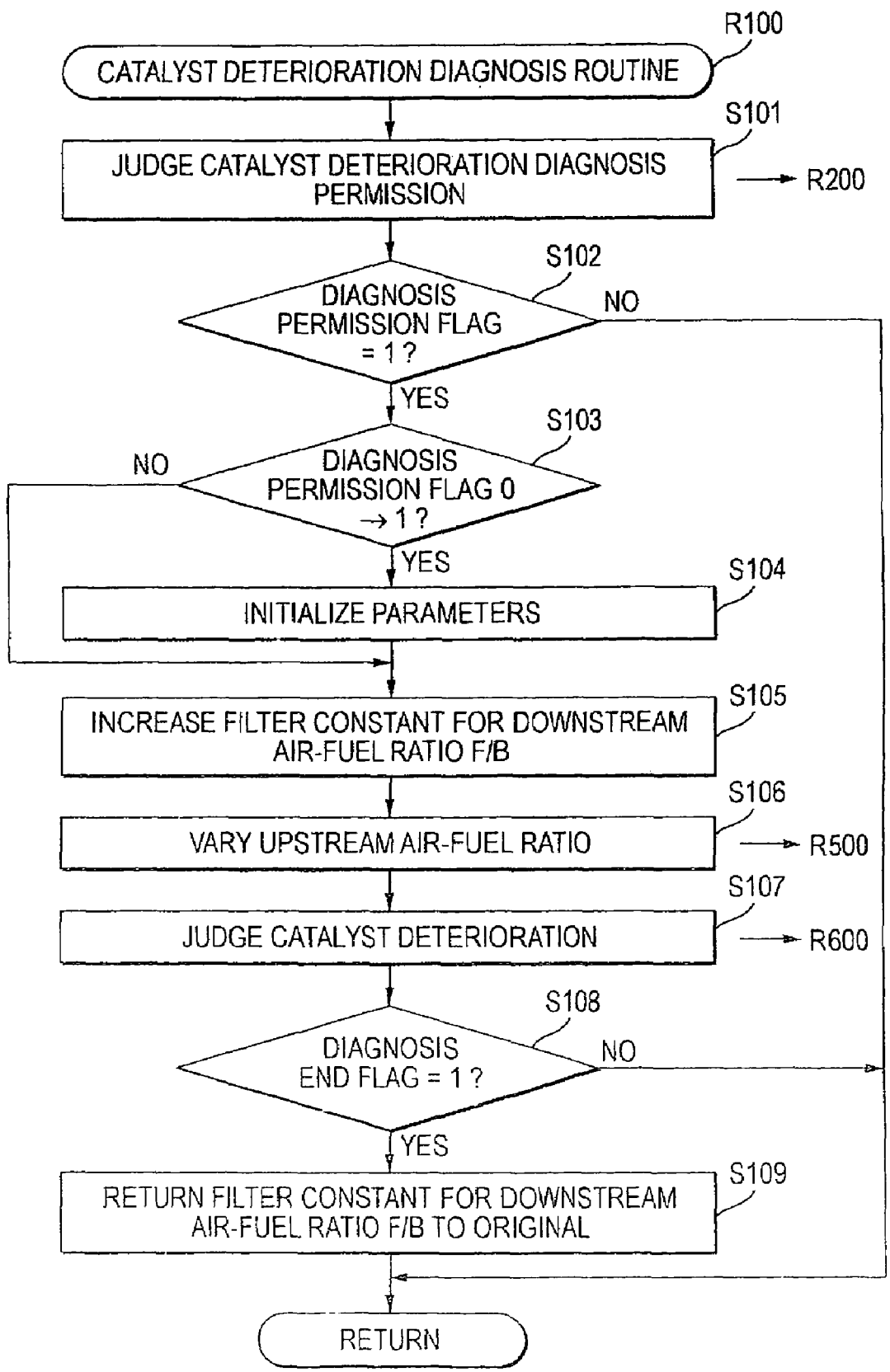
FIG. 3 is a flowchart showing a catalyst deterioration diagnosing routine of the first embodiment.
Figure 6:
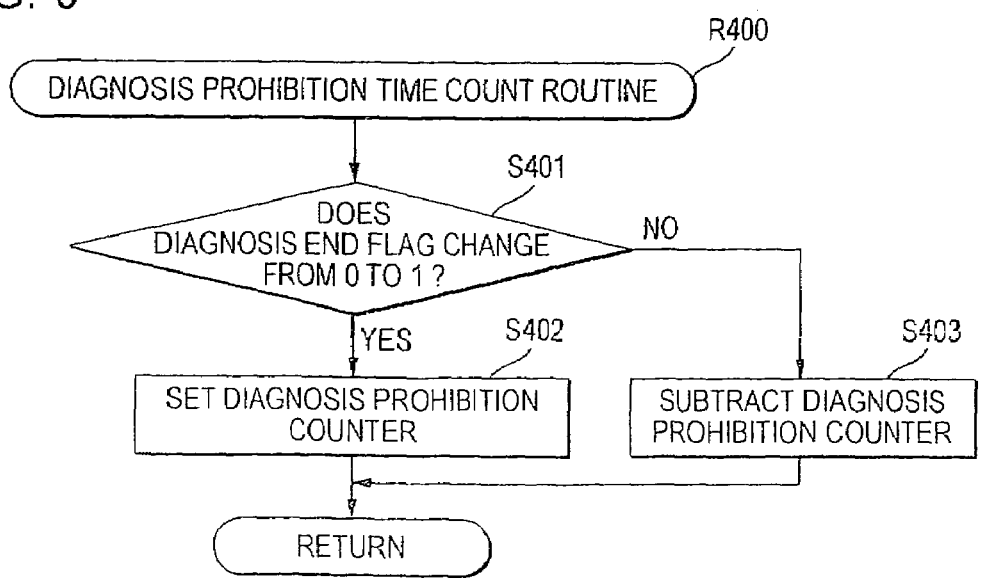
FIG. 6 is a flowchart showing a diagnosis prohibition time count routine of the first embodiment.
Figure 7:
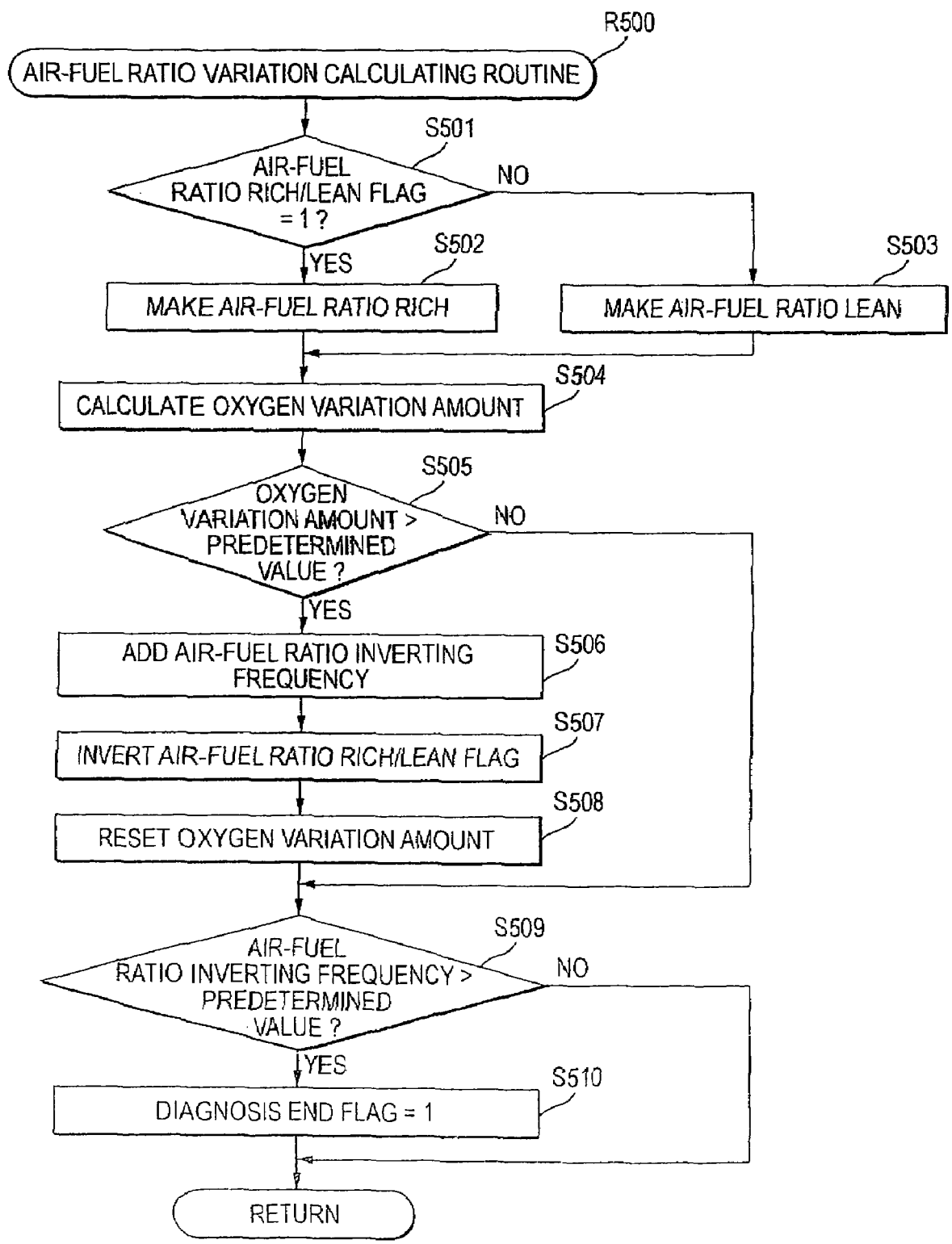
FIG. 7 is a flowchart showing an air-fuel ratio variation calculating routine of the first embodiment.
Figure 8A:
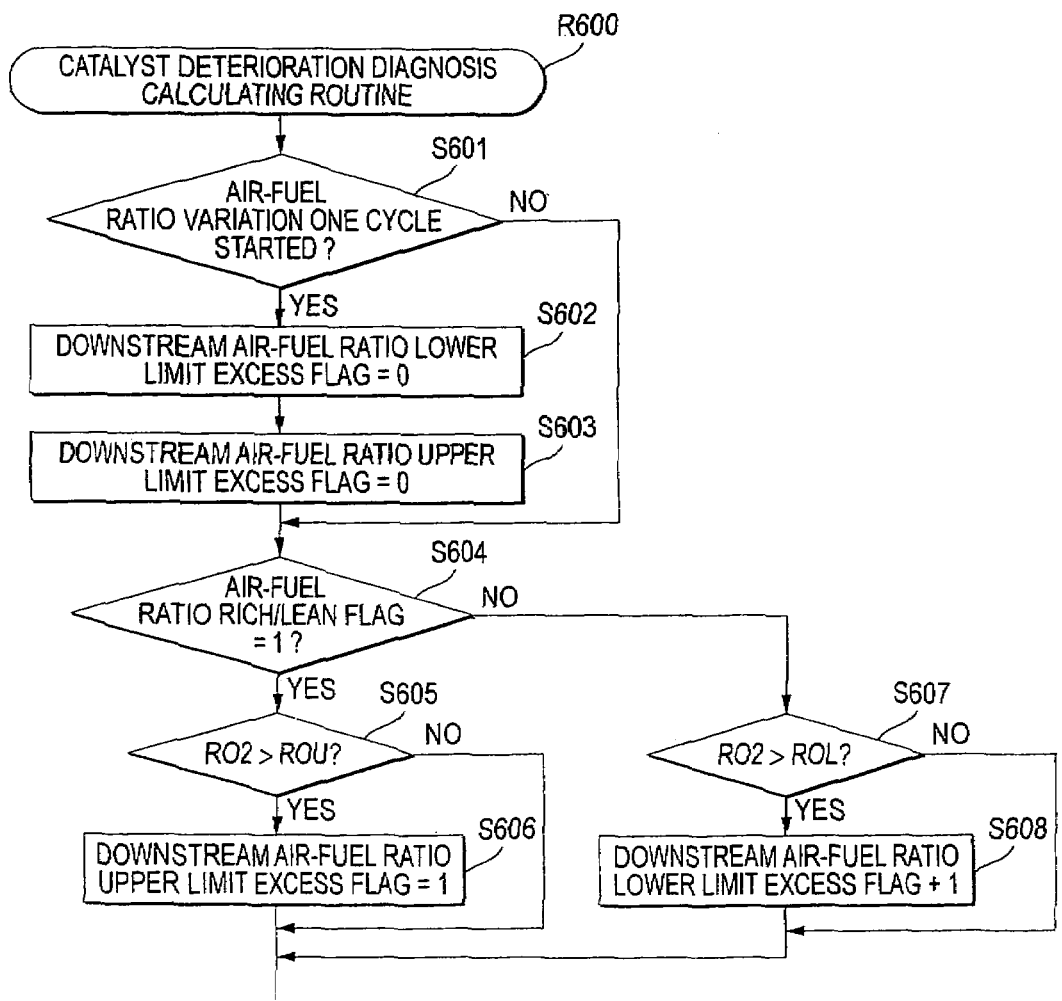
FIG. 8A is a part of flowchart showing a catalyst deterioration diagnosis calculating routine of the first embodiment.
Figure 8B:
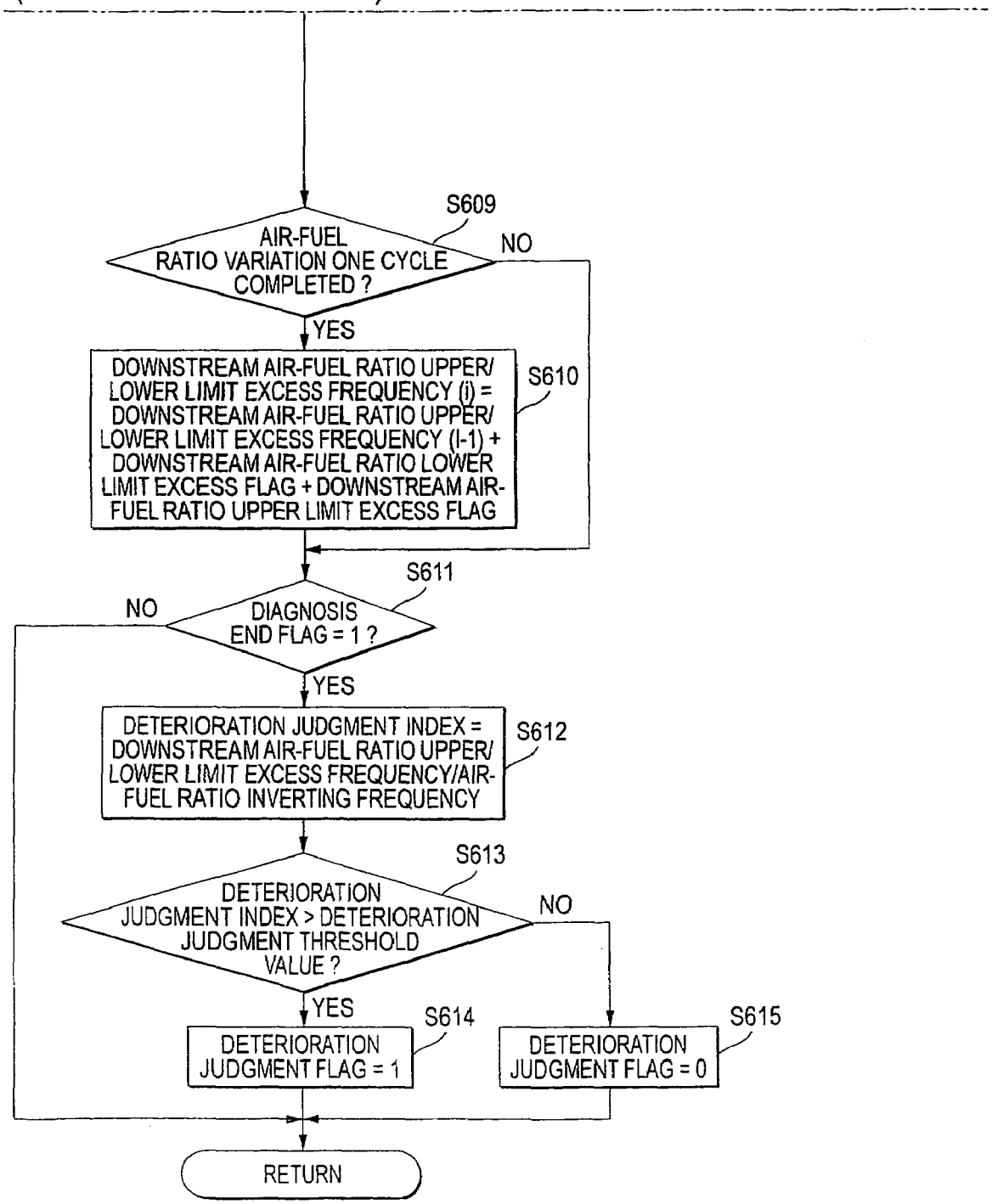
FIG. 8B is a remaining part of the flowchart showing a catalyst deterioration diagnosis calculating routine of the first embodiment.

The catalyst deterioration diagnosing means 180 of the present invention will be described in more detail with reference to a flowchart. FIG. 3 is a flowchart showing a catalyst deterioration diagnosis routine R100 according to the first embodiment, FIG. 4 is a flowchart showing a catalyst deterioration diagnosis permission judging routine R200 contained in the catalyst deterioration diagnosis routine R100 shown in FIG. 3, FIG. 5 is a flowchart showing a driving area judging routine R300 contained in the catalyst deterioration diagnosis permission judging routine R200 shown in FIG. 4, FIG. 6 is a flowchart showing a diagnosis prohibition time count routine R400 contained in the catalyst deterioration diagnosis permission judging routine R200 shown in FIG. 4, FIG. 7 is a flowchart showing an upstream air-fuel ratio variation routine R500 contained in the catalyst deterioration diagnosis routine R100 shown in FIG. 3, and FIG. 8A, FIG. 8B is a flowchart showing a catalyst deterioration diagnosis judging routine R600 contained in the catalyst deterioration diagnosis routine R100 shown in FIG. 3.

The catalyst deterioration diagnosis routine R100 shown in FIG. 3 is installed as a part of the main routine containing main operations such as the fuel injection and ignition timing calculations, etc. of the internal combustion engine 100 by the control unit 131, and executed every fixed time during the operation of the internal combustion engine 100.

Figure 4:
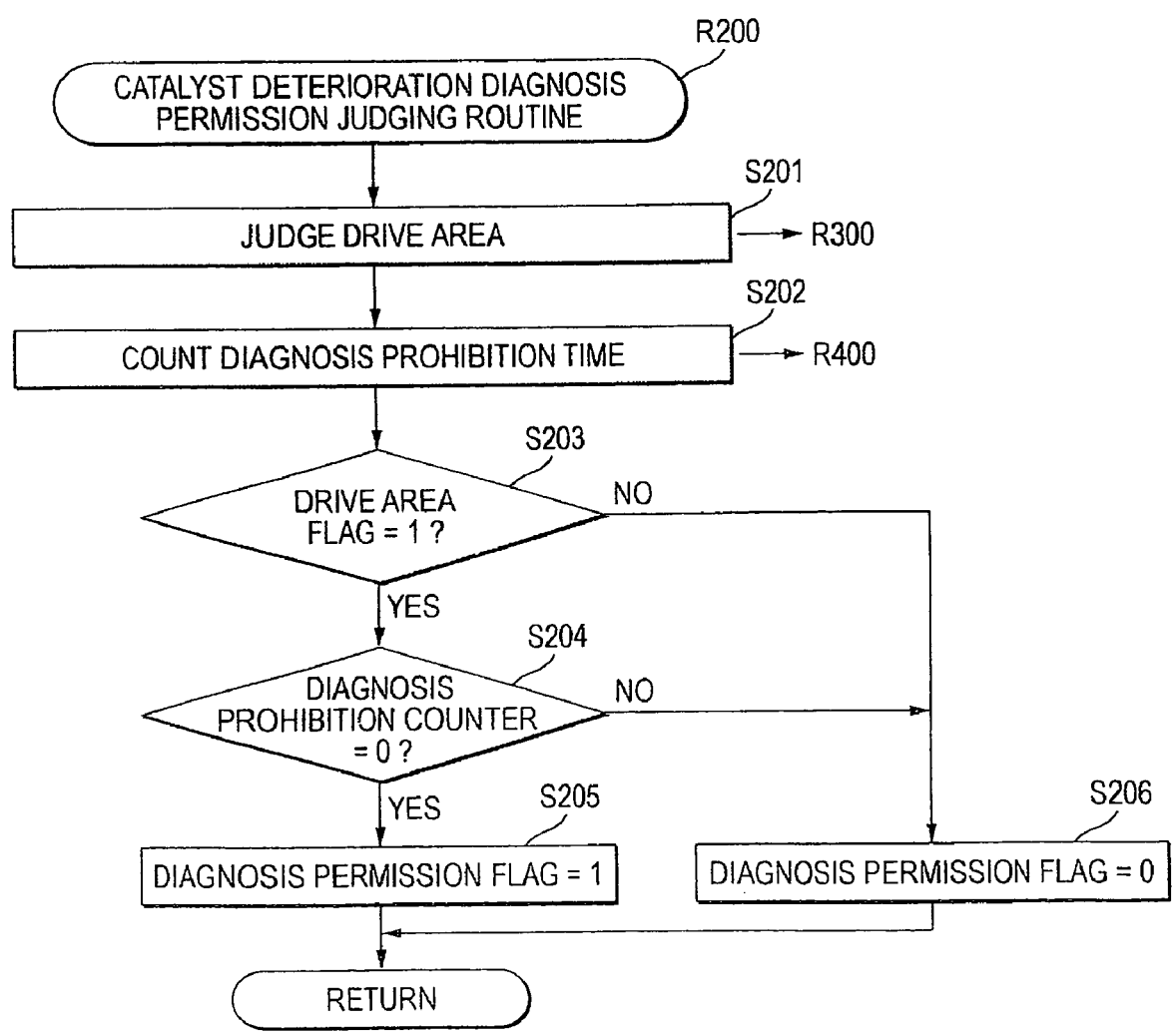
FIG. 4 is a flowchart showing a catalyst deterioration diagnosis permission judging routine according to the first embodiment.

According to the catalyst deterioration diagnosis routine R100 shown in FIG. 3, the processing jumps to the catalyst deterioration diagnosis permission judging routine R200 shown in FIG. 4 in order to judge in the first step S101 whether the catalyst deterioration diagnosis is permitted or not. In the catalyst deterioration diagnosis permission judging routine R200 shown in FIG. 4, in the first step S201, the processing jumps to the driving area judging routine R300 shown in FIG. 5 in order to judge whether the driving area of the internal combustion 100 at that time is a catalyst deterioration diagnosis permission area.

Figure 5:
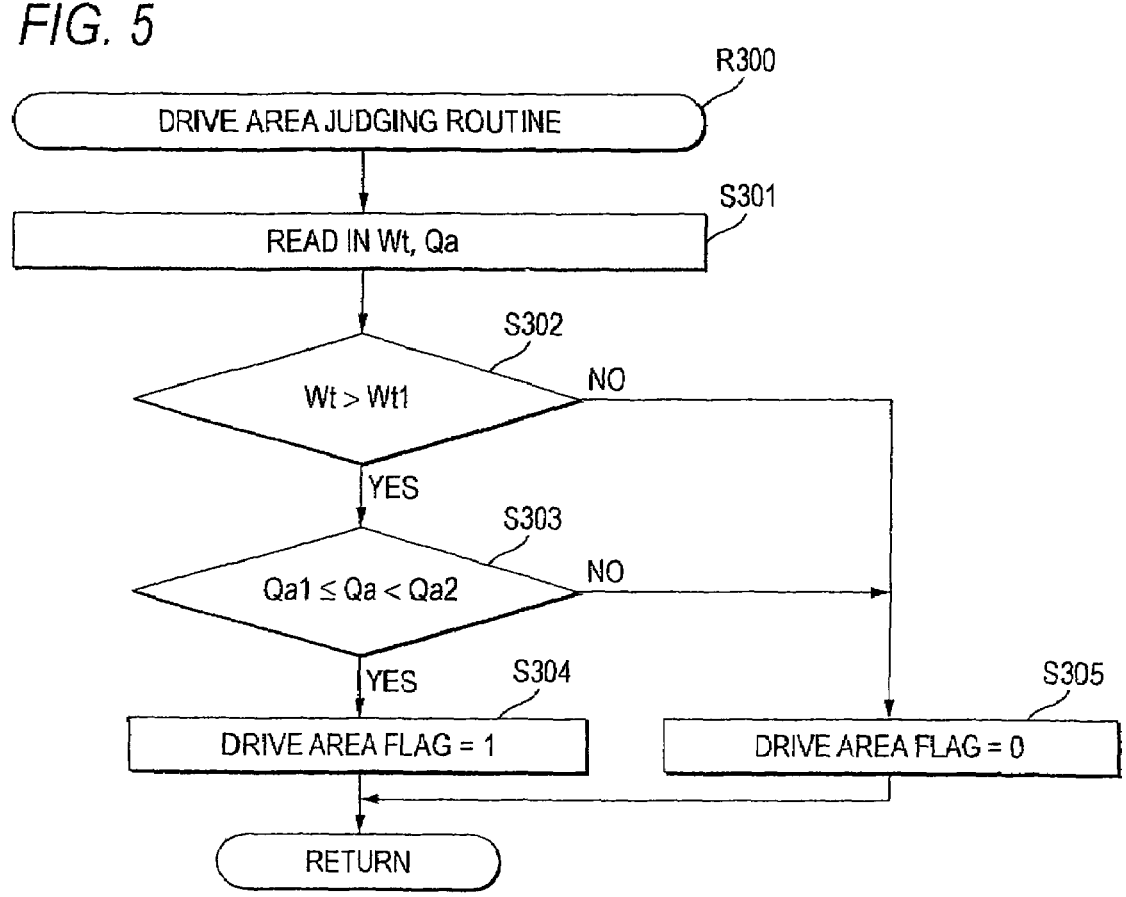
FIG. 5 is a flowchart showing a driving area judging routine of the first embodiment.

In the driving area judging routine R300 shown in FIG. 5, in the first step S301, the cooling water temperature Wt detected by the water temperature sensor 141 and the intake air amount Qa detected by the air flow sensor 143 are taken in. In the next step S302, it is judged whether the cooling water temperature Wt is larger than a predetermined value Wt1 (i.e., Wt>Wt1). In the next step S303, it is judged whether the intake air amount Qa has the following relationship with predetermined values Qa1, Qa2: Qa1≦Qa<Qa2. If the judgment result of each of the steps S302, S303 is YES, the catalyst deterioration diagnosis is possible, and thus the processing goes to step S304 to set a driving area flag FDR to 1. If at least one or both of the judgment results of the steps S302, S303 are NO, the processing goes to step S305 to reset the driving area flag FDR to zero. Then, the processing returns from the steps S304, S305 to the step S201 of FIG. 4.

In the next step S202 subsequent to the step S201 of FIG. 4, the processing jumps to the diagnosis prohibition time count routine R400 shown in FIG. 6 in order to count the diagnosis prohibition time. In this diagnosis prohibition time count routine R400, it is judged in the first step S401 whether a diagnosis end flag FCC is being shifted from 0 to 1. The diagnosis end flag FCC varies from 0 to 1 at the time point when the catalyst deterioration diagnosis routine R100 shown in FIG. 3 is finished. Accordingly, in step S401, the time point when the catalyst deterioration diagnosis is finished is detected as a result. In the case of the time point when the catalyst deterioration diagnosis is finished, the judgment result of the step S401 is YES, and the processing goes to step S402. In step S402, a diagnosis prohibition counter CC1 is set to a predetermined value, and then the processing returns to step S202 of FIG. 4. If the judgment result of step S401 is NO, the processing goes to step S403. In step S403, the diagnosis prohibition counter CC1 is subtracted by a unit value, and then the processing returns to the step S202. The diagnosis prohibition counter CC1 is constructed by RAM 134 and CPU 132.

The diagnosis prohibition time count routine R400 shown in FIG. 6 is executed in step S202 every time the catalyst deterioration diagnosis routine R100 of FIG. 3 is executed and the catalyst deterioration diagnosis permission judging routine R200 is executed in step S101. In the diagnosis prohibition time counter routine R400, the diagnosis prohibition counter CC1 is subtracted by only the unit value every time the judgment result of the step S401 becomes NO. The subtraction of the diagnosis prohibition counter CCI is carried out every time the diagnosis prohibition time count routine R400 is executed until the count value thereof is equal to zero. In the diagnosis prohibition time count routine R400, for example, when the value corresponding to 5 minutes is set to the diagnosis prohibition counter CCI in step S402, after the catalyst deterioration diagnosis is finished, the next catalyst deterioration diagnosis is prohibited for 5 minutes until the diagnosis prohibition counter CCI is equal to zero.

In the step S203 subsequent to the step S202 of FIG. 4, it is judged whether the driving area flag FDR is set to 1. In the next step S204, it is judged whether the diagnosis prohibition counter CCI is equal to zero. If the judgment results of the steps S203 and S204 are YES, the processing goes to step S205 and the diagnosis permission flag FCA is set to 1 in step S205 because the catalyst deterioration diagnosis is judged to be possible. If the judgment result of at least one or both of the steps S203 and S204 is NO, the processing goes to step S206. In step S206, the diagnosis permission flag FCA is set to zero because the catalyst diagnosis is judged as being impossible. The processing returns from the steps S205, S206 to the step S101 of FIG. 3.

In the step S102 subsequent to the step S101 of FIG. 3, it is judged whether the diagnosis permission flag FCA is set to 1. If the judgment result of the step S102 is YES, the processing goes to the next step S103. If the judgment result of the step S102 is NO, the processing returns to the main routine. In step S103, it is judged whether the diagnosis permission flag FCA is varying from 0 to 1. At the time point when the catalyst deterioration diagnosis is possible, the diagnosis permission flag FCA varies from 0 to 1 in step S205 of FIG. 4. Accordingly, in step S103, it is consequently judged whether the present time is a starting time point for the catalyst deterioration diagnosis. If the judgment result of the step S103 is YES, the processing goes to the next step S104. In step S104, each parameter associated with the catalyst deterioration diagnosis is initialized as follows.

The upper and lower limit excess frequency to the downstream air-fuel ratio detection output RO2 (NEUL)=0
An oxygen variation amount $\Delta OSC=0$
An air-fuel ratio rich lean flag FAFRL=1
An air-fuel ratio inverting frequency AFTON=0
A deterioration judgment index IJI=0
A diagnosis end flag FCC=0

In the next step S105, the filter constant of the low pass filter 174 is increased, and under the catalyst deterioration diagnosis state that the catalyst deterioration diagnosing means 180 diagnoses the deterioration of the catalyst 122, the detection output RO21 output from the low pass filter 174 is controlled not to be affected by the upstream air-fuel ratio variation. In the next step S106, the processing jumps to the air-fuel ratio variation calculation routine R500 shown in FIG. 7 in order to vary the upstream air-fuel ratio AF.

In the air-fuel ratio variation calculation routine R500 shown in FIG. 7, it is judged in the first step S501 whether the air-fuel ratio rich lean flag FAFRL is equal to 1. The air-fuel ratio rich lean flag FAFRL is set to 1 when the target upstream air-fuel ratio AFT is set to the rich state, and it is set to 0 when the target upstream air-fuel ratio AFT is set to the lean state. If the air-fuel ratio rich lean flag FAFRL is set to 1 and the judgment result of the step S501 is YES, the processing goes to step S502. IN step S502, the target upstream air-fuel ratio AFT is made richer than the theoretical air-fuel ratio. If the air-fuel ratio rich lean flag FAFRL is equal to zero and the judgment result of the step S501 is NO, the processing goes to the step S503, and in the step S503, the target upstream air-fuel ratio AFT is made leaner than the theoretical air-fuel ratio.

In the next step S504, the oxygen variation amount $\Delta OSC$ is calculated according to the following equation (2).

$$\Delta OSC(i)=\Delta OSC(i-1)+|AF-AF0|/AF0 \times Qa \times \alpha \quad (2)$$

In the equation (2), AF represents the upstream air-fuel ratio, AF0 represents the basic target upstream air-fuel ratio, and $\alpha$ represents a conversion efficiency from an excess air factor to an oxygen mass. $\Delta OSC(i)$ represents the current value of the oxygen variation amount $\Delta OSC$, and $\Delta OSC(i-1)$ represents the previous value.

In the next step S505, it is judged whether the oxygen variation amount $\Delta OSC$ reaches a predetermined value. If the upstream air-fuel ratio AF is lean, a predetermined amount of oxygen is supplied to the catalyst 122, and if the upstream air ratio AF is rich, a predetermined amount of oxygen is consumed by the catalyst 122. If the judgment result of the step S505 is YES, the processing goes to the next steps S506 to S508. In step S506, the air-fuel ratio inverting frequency AFTON is added with +1, and in the next step S507, the air-fuel ratio rich lean flag FAFRL is inverted. In the next step S508, the oxygen variation amount $\Delta OSC$ is reset to 0, and then the processing goes to the next step S509. If the judgment result of the step S505 is NO, the steps S506, S507 and S508 are bypassed, and then the processing goes to step S509.

In the next step S509, it is judged whether the air-fuel ratio inverting frequency AFTON exceeds a predetermined value. If the air-fuel ratio inverting frequency AFTON exceeds the predetermined value and the judgment result of the step S509 is YES, the catalyst deterioration diagnosis is judged to be finished, and thus the processing goes to the next step S510. In this step S510, the diagnosis end flag FCC is set to 1. If the judgment result of the step S509 is NO, the processing bypasses the step S510 and returns to the step S106 of FIG. 3.

When the upstream air-fuel ratio variation calculation in step S106 of FIG. 3 is finished, the processing goes to the next step S107 shown in FIG. 3. In this step S107, the processing jumps to the catalyst deterioration diagnosis calculation routine R600 shown in FIG. 8A, FIG. 8B to execute the catalyst deterioration judgment. In this catalyst deterioration diagnosis calculation routine R600, it is judged in the first step S601 whether the present time is a starting time point of one cycle of the air-fuel ratio variation. If the present time is the starting time point of one cycle of the air-fuel ratio variation and the judgment result of the step S601 is YES, the processing goes to the next step S602. In the step S602, the downstream air-fuel ratio lower limit excess flag FROL to the downstream air-fuel ratio detection output RO2 of the downstream air-fuel ratio sensor 146 is set to zero. In the next step S803, the downstream air-fuel ratio upper limit excess flag FROU to the downstream air-fuel ratio detection output RO2 is set to zero, and the processing goes to the next step S604. If the judgment result of the step S601 is NO, the processing bypasses the steps S602 and S603 and goes to step S604.

In step S604, it is judged whether the air-fuel ratio rich lean flag FAFRL is equal to 1 in order to judge whether the target upstream air-fuel ratio AFT is rich. If the target upstream air-fuel ratio AFT is rich and the air-fuel ratio rich lean flag FAFRL=1, the judgment result of the step S604 is YES and thus the processing goes to the next step S605. In the step S605, it is judged whether the downstream air-fuel ratio detection output RO2 exceeds the downstream air-fuel ratio upper limit value ROU. If the judgment result is YES, the processing goes to step S606. In this step S606, the downstream air-fuel ratio upper limit excess flag FROU is set to 1. Conversely, if the target upstream air-fuel ratio AFT is lean and the air-fuel ratio rich lean flag FAFRL=0, the judgment result of the step S604 is NO, and thus the processing goes to step S607. In step S607, it is judged whether the downstream air-fuel ratio detection output RO2 exceeds the downstream air-fuel ratio lower limit value ROL. If the downstream air-fuel ratio detection output RO2 exceeds the downstream air-fuel ratio lower limit value ROL, the judgment result of the step S607 is YES, and in the next step S608 the downstream air-fuel ratio lower limit excess flag FROL is set to 1.

The processing goes from the steps S606, S608 to the next step S609. If the judgment result of the step S605 is NO, the processing bypasses the step S606 and goes to step S609. If the judgment result of the step S607 is NO, the processing bypasses the step S608 and goes to the step S609.

IN step S609, it is judged whether the air-fuel ratio variation completes one cycle containing one rich period and one lean period. If the judgment result of the step S609 is YES, the downstream air-fuel ratio upper/lower limit excess frequency NEUL associated with the downstream air-fuel ratio detection output RO2 is calculated according to the following equation (3) in step S610 every time one cycle of the air-fuel ratio variation is completed:

$$NEUL(i)=NEUL(i-1)+FROL+FROU \quad (3)$$

In the equation (3), NEUL (i) represents the present value of the downstream air-fuel ratio upper/lower limit excess frequency NEUL and NEUL (i-1) represents the previous value thereof.

In the next step S611, it is judged whether the diagnosis end flag FCC is set to 1. If the diagnosis end flag FCC is set to 1 and the judgment result of the step S611 is YES, the processing goes to the next step S612. In this step S612, a deterioration judgment index IJI is calculated by the following equation (4).

$$IJI=NEUL/AFTON \quad (4)$$

As the downstream air-fuel ratio upper/lower limit excess frequency NEUL is closer to the air-fuel ratio inverting frequency AFTON of the upstream air-fuel ratio AF, the deterioration judgment index IJI is larger and closer to 1.0.

In the next step S613, it is judged whether the deterioration judgment index IJI is larger than a predetermined deterioration judgment threshold value. If it is judged in step S613 that the deterioration judgment index IJI is larger than the deterioration judgment threshold value IJT, the judgment result is YES, and the processing goes to the next step S614. If the judgment result of the step S613 is NO, the processing goes to the next step S615. In step S614, the catalyst 122 is judged as being deteriorated, and thus a deterioration judgment flag FIJ is set to 1. In step S615, the deterioration judgment flag FIJ is set to 0. The processing returns from the steps S614, S615 to the step S107 of FIG. 3.

If the judgment result of the step S611 is NO, the processing bypasses the steps S612, S613, S614 and S615, and returns to the step S107 of FIG. 3. In step S108 subsequent to the step S107 shown in FIG. 3, it is judged whether the diagnosis end flag FCC is set to 1. If the catalyst deterioration diagnosis is finished and the diagnosis end flag FCC is set to 1, the judgment result of the step S108 is YES. Therefore, the processing goes to step S109 to return the filter constant of the low pass filter 174 to an original small value, and then returns to the main routine. If the catalyst deterioration diagnosis has not yet been finished and the judgment result of the step S108 is NO, the processing returns to the main routine.

In the catalyst deterioration diagnosis calculating routine R600 shown in FIG. 8A, FIG. 8B, if the deterioration judgment flag FIJ is set to 1 in step S613, a failure display lamp MIL provided to the driver's seat of a vehicle is turned on, and quickly inform the deterioration of the catalyst 122 to the driver to promote the maintenance and check of the catalyst 122. The failure display lamp MIL may be turned on when the catalyst deterioration diagnosis calculating routine R600 is repeated at plural times to prevent misjudgment and the deterioration judgment flag FIJ sequentially indicates "1" at a predetermined frequency.

The behaviors of the actual respective parameters in the catalyst deterioration diagnosis routine R100, the catalyst deterioration diagnosis permission judging routine R200, the drive area judgment routine R300, the diagnosis prohibition time count routine R400, the air-fuel ratio variation calculating routine R500 and the catalyst deterioration diagnosis calculating routine R600 will be described with reference to FIGS. 9(a)-(n) and FIGS. 10(a)-(n). FIGS. 9(a)-(n) show the behaviors of the respective parameters of the catalyst deterioration diagnosis when the catalyst 122 is not deteriorated, and FIGS. 10(a)-(n) show the behaviors of these parameters when the catalyst 122 is deteriorated.

FIG. 9(a), FIGS. 10(a) represents the drive area flag FDR, FIG. 9(b), FIG. 10(b) represents the count value of the diagnosis prohibition counter CCI, FIG. 9(c), FIG. 10(c) represents the diagnosis permission flag FCA, FIG. 9(d), FIG. 10(d) represents the air-fuel ratio rich lean flag FAFRL, FIG. 9(e), FIG. 10(e) represents the oxygen variation amount ΔOSC, FIG. 9(f), FIG. 10(f) represents the air-fuel ratio inverting frequency AFTON, FIG. 9(g), FIG. 10(g) represents the diagnosis end flag FCC, FIG. 9(h), FIG. 10(h) represents the upstream air-fuel ratio detection output RO1, FIG. 9(i), FIG. 10(i) represents the downstream air-fuel ratio detection output RO2, FIG. 9(j), FIG. 10(j) represents the downstream air-fuel ratio upper limit excess flag FROU, FIG. 9(k), FIG. 10(k) represents the downstream air-fuel ratio lower limit excess flag FROL, FIG. 9(*l*), FIG. 10(*l*) represents the downstream air-fuel ratio upper/lower limit excess frequency NEUL, FIG. 9(*m*), FIG. 10(*m*) represents the deterioration judgment index IJI, and FIG. 9(*n*), FIG. 10(*n*) represents the deterioration judgment flag FIJ. Furthermore, in FIG. 9(*h*), FIG. 10(*h*), the target upstream air-fuel ratio AFT is indicated by a broken line, and in FIG. 9(*i*), FIG. 10(*i*) the downstream air-fuel ratio detection output RO21 output from the low pass filter 174 is indicated by a broken line.

The abscissa axis of FIGS. 9(*a*)-(*n*) and FIGS. 10(*a*)-(*n*) represent the common time to the respective parameters. The timings A, B, C and D are set along this time axis. The diagnosis permission flag FCA is set to 1 for the period between the timings A and B, the diagnosis permission flag FCA is set to zero for the next period between the timings B and C, and the diagnosis permission flag FCA is set to 1 again for the next period between the timings C and D.

FIGS. 9(*a*)-(*n*) show the behaviors of the respective parameters of the catalyst deterioration diagnosis when the catalyst 122 is not deteriorated. At the timing A, the drive area of the internal combustion engine 100 enters a diagnosis permission area, and the drive area flag FDR is set to 1 in FIG. 9(*a*). As shown in FIG. 9(*b*), the count value of the diagnosis prohibition counter CCI is equal to zero at the timing A, so that the diagnosis permission flag FCA is set to 1 and the catalyst diagnosis flow is started. Here, in step S104, the respective parameters are initialized as described above. Furthermore, the filter constant of the low pass filter 174 is switched to a large value.

In the period when the diagnosis permission flag FCA is set to 1, the air-fuel ratio rich lean flag FAFRL is inverted as shown in FIG. 9(*d*) to alternately vary the upstream air-fuel ratio AF between the rich and lean states every time the oxygen variation amount ΔOSC shown in FIG. 9(*e*) reaches a predetermined value. When the upstream air-fuel ratio AF is rich, the exhaust gas discharged from the combustion chamber 103 of the internal combustion engine 100 contains little oxygen, but a large amount of carbon monoxide (CO) and hydrocarbon gas (HC), and oxygen adsorbed by the catalyst 122 is consumed, so that the oxygen adsorption amount stocked in the catalyst 122 is reduced. Conversely, when the upstream air-fuel ratio AF is lean, the exhaust gas discharged from the combustion chamber 103 contains a large amount of oxygen and nitrogen oxide gas (NOx), so that the catalyst 122 adsorbs oxygen and thus the oxygen adsorption amount in the catalyst 122 is increased.

In FIGS. 9(*a*)-(*n*), the catalyst 122 is not deteriorated, and ceria contained in the catalyst 122 absorbs the variation of oxygen, so that the variation of the upstream air-fuel ratio AF does not appear in the downstream air-fuel ratio detection output RO2 as shown in FIG. 9(*i*). Therefore, the downstream air-fuel ratio upper/lower limit excess frequency NEUL is kept to zero as shown in FIG. 9(*l*) without the downstream air-fuel ratio detection output RO2 being deviated from the preset upper/lower limit threshold of the downstream air-fuel ratio. Therefore, the deterioration judgment index IJI is also equal to zero as shown in FIG. 9(*m*), and the deterioration judgment flag FIJ is also reset and kept to 0 as shown in FIG. 9(*n*). In FIGS. 9(*a*)-(*n*), the air-fuel ratio variation is given for only two cycles in the period when the diagnosis permission flag FCA is set to 1. However, by giving the air-fuel ratio variation of about 5 to 30 cycles, the deterioration diagnosis precision is enhanced.

At the timing B, the air-fuel ratio inverting frequency AFTON reaches a predetermined value as shown in FIG. 9(*f*), and the diagnosis end flag FCC is set to 1 as shown in FIG. 9(*g*). The count value of the diagnosis prohibition counter CCI is subtracted from the timing B as shown in FIG. 9(*b*), and the count value thereof is equal to zero at the timing C. In the period between the timings B and C, the diagnosis permission flag FCA is reset to zero as shown in FIG. 9(*c*), and the catalyst deterioration diagnosis is prohibited. In the period between the timings B and C, the leaning calculation control switching means 167 is turned on. In the period between the timings B and C, the catalyst deterioration diagnosis is prohibited, and the oxygen adsorption amount in the catalyst 122 is stable, so that the upstream air-fuel ratio leaning calculating means 166 can receive an integration value from the PI calculating means 173 of the downstream air-fuel ratio feedback control means 170 through the turn-on leaning calculation control switching means 167, and perform the stable upstream target air-fuel ratio leaning. Accordingly, the upstream air-fuel ratio leaning precision of the upstream air-fuel ratio leaning calculating means 166 can be enhanced, and the exhaust gas can be prevented from being worse due to A/F disturbance or the like which is caused by the evaporation purge and the master back at the braking time.

FIGS. 10(*a*)-(*n*) show the behaviors of the respective parameters for the catalyst deterioration diagnosis when the catalyst 122 is deteriorated. As in the case of FIGS. 9(*a*)-(*n*), when the catalyst diagnosis flow is started under the state that the drive area flag FDR shown in FIG. 10(*a*) is set to 1, the upstream air-fuel ratio AF is periodically varied between the rich and lean states. Since the catalyst 122 is deteriorated, the catalyst 12 cannot absorb variation of oxygen, and suffers the variation of the upstream air-fuel ratio AF, so that the downstream air-fuel ratio detection output RO2 varies periodically as shown in FIG. 10(*i*). Under the catalyst deterioration diagnosis state that the deterioration diagnosis of the catalyst 122 is carried out by the catalyst deterioration diagnosing means 180, the filter constant of the low pass filter 174 is set to a large value, so that the variation of the downstream air-fuel ratio detection output RO21 output from the low pass filter 174 is small even when the downstream air-fuel ratio detection output RO2 varies, and thus the downstream air-fuel ratio feedback amount Cf0 is little affected.

If the filter constant of the low pass filter 174 is set to a small value during the catalyst deterioration diagnosis, the air-fuel ratio variation given to the upstream air-fuel ratio AF affects the downstream air-fuel ratio, and further the variation of the downstream air-fuel ratio corrects the upstream air-fuel ratio AF. Therefore, the hunching phenomenon of the upstream air-fuel ratio detection output RO1 is intensified as shown in FIGS. 11(*h*)(*i*) while the variation of the upstream air-fuel ratio AF and the variation of the downstream air-fuel ratio interfere with each other. If the hunching phenomenon of the upstream air-fuel ratio AF is intensified, there would be a risk that the drivability of the vehicle is lost.

In the first embodiment, the filter constant of the low pass filter 174 in the downstream air-fuel ratio feedback control means 170 is increased during catalyst deterioration diagnosis. Therefore, as shown in FIGS. 12(*h*)(*i*), the variation of the upstream air-fuel ratio detection output RO1 and the interface with the downstream air-fuel ratio detection output RO2 can be prevented, and the drivability of the vehicle can be prevented from being worse. FIG. 11(*c*), FIG. 12(*c*) represents the diagnosis permission flag FCA, FIG. 11(*h*), FIG. 12(*h*) represents the upstream air-fuel ratio detection output RO1, and FIG. 11(*i*), FIG. 12(*i*) represents the downstream air-fuel ratio detection output RO2. In FIG. 11(*h*), FIG. 12(*h*), the target upstream air-fuel ratio AFT is indicated by a broken line, and in FIG. 11(*i*), FIG. 12(*i*), the downstream air-fuel ratio detection output RO21 output from the low pass filter 174 is indicated by a broken line.

When the upstream air-fuel ratio variation AFOSC which varies periodically between the rich and lean states is applied to the deteriorated catalyst 122, the downstream air-fuel ratio detection output RO2 varies beyond the upper limit value ROU and the lower limit value ROL. Therefore, the downstream air-fuel ratio upper limit excess flag FROU and the downstream air-fuel ratio lower excess flag FROL are set to 1 as shown in FIGS. 10(j)(k), and the downstream air-fuel ratio upper/lower limit excess frequency NEUL increases as shown in FIG. 10(l). When the deterioration judgment index IJI calculated as NEUL/AFTON on the basis of the downstream air-fuel ratio upper/lower limit excess frequency NEUL and the air-fuel ratio inverting frequency AFTON exceeds a predetermined value, the catalyst 122 is judged as being deteriorated, and the deterioration judgment flag FIJ is set to 1 as shown in FIG. 10(n).

When the catalyst is diagnosed to be deteriorated and the deterioration judgment flag FIJ is set to 1 as shown in FIG. 10(n), the downstream air-fuel ratio detection output control switching means 175 is thereafter turned off, the feedback of the downstream air-fuel ratio detection outputs RO2 and RO21 is stopped, and the downstream air-fuel ratio feedback amount Cf0 corresponds to the target downstream air-fuel ratio output BFT. Under the state that the catalyst 122 is deteriorated due to accident fire or the like, the catalyst 122 does have any more normal action and thus the exhaust gas discharged from the combustion chamber 103 of the internal combustion engine 100 directly reaches the downstream side of the catalyst 122. Therefore, even when the downstream air-fuel ration feedback amount Cf0 is calculated by the downstream air-fuel ratio detection outputs RO2 and RO21, the downstream air-fuel ratio of the catalyst 122 cannot be kept in the neighborhood of the target downstream air-fuel ratio output BFT. Accordingly, the downstream air-fuel ratio feedback amount Cf0 interferes with the upstream air-fuel ratio feedback amount Cfb to induce hunching, and thus the drivability is remarkably degraded. When the catalyst 122 is diagnosed to be deteriorated, the feedback of the downstream air-fuel ratio detection outputs RO2 and RO21 is stopped, and the downstream air-fuel ratio feedback amount Cf0 is made to correspond to the target downstream air-fuel ratio output BFT, whereby the drivability of the vehicle can be prevented from being worse.

In the first embodiment, a linear air-fuel ratio sensor is used as the upstream air-fuel ratio sensor 45. However, even when the upstream air-fuel ratio sensor 45 is a λ sensor, the interference between the upstream air-fuel ratio and the downstream air-fuel ratio feedback can be prevented by increasing the filter constant of the low pass filter 174 of the downstream air-fuel ratio feedback means 170 at the catalyst deterioration diagnosis time. Furthermore, the interference between the upstream air-fuel ratio and the downstream air-fuel ratio feedback can be prevented by stopping the feedback of the downstream air-fuel ratio detection outputs RO2 and RO21 when the catalyst 122 is deteriorated, and thus the drivability of the vehicle can be prevented from being worse.

As described above, according to the first embodiment, when the deterioration diagnosis of the catalyst 122 by the catalyst deterioration diagnosing means 180 is finished, the deterioration diagnosis prohibition time of the catalyst 122 is set by the diagnosis prohibition counter CCI after the deterioration diagnosis concerned. For this deterioration diagnosis prohibition time, the deterioration diagnosis of the catalyst 122 is prohibited, and the harmful gas purifying function of the catalyst 122 is restored, so that the harmful gas purifying function of the catalyst 122 can be prevented from being lowered.

Second Embodiment

Figure 13:
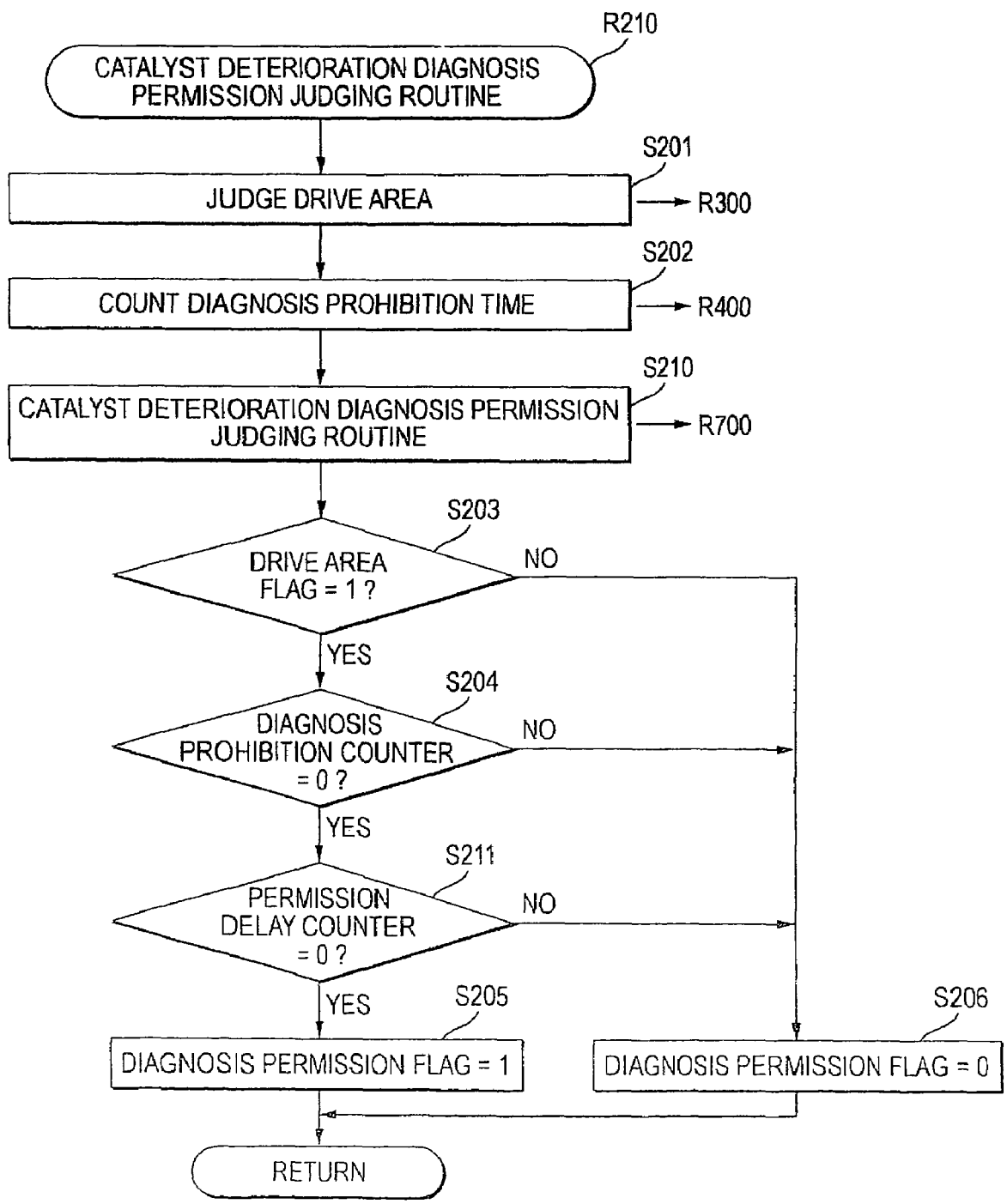
FIG. 13 is a flowchart showing a catalyst deterioration diagnosis permission judging routine of a second embodiment of the air-fuel ratio feedback control device according to the present invention.

According to a second embodiment, the processing jumps to a catalyst deterioration diagnosis permission judging routine R210 shown in FIG. 13 in step S101 of FIG. 3 of the first embodiment. In the first embodiment, the processing jumps to the catalyst deterioration diagnosis permission judging routine R200 shown in FIG. 4 in step S101. However, according to the second embodiment, the catalyst deterioration diagnosis permission judging routine R210 shown in FIG. 13 is used in place of the catalyst deterioration diagnosis permission judging routine R200 shown in FIG. 4. The other construction is the same as the first embodiment.

Figure 14:
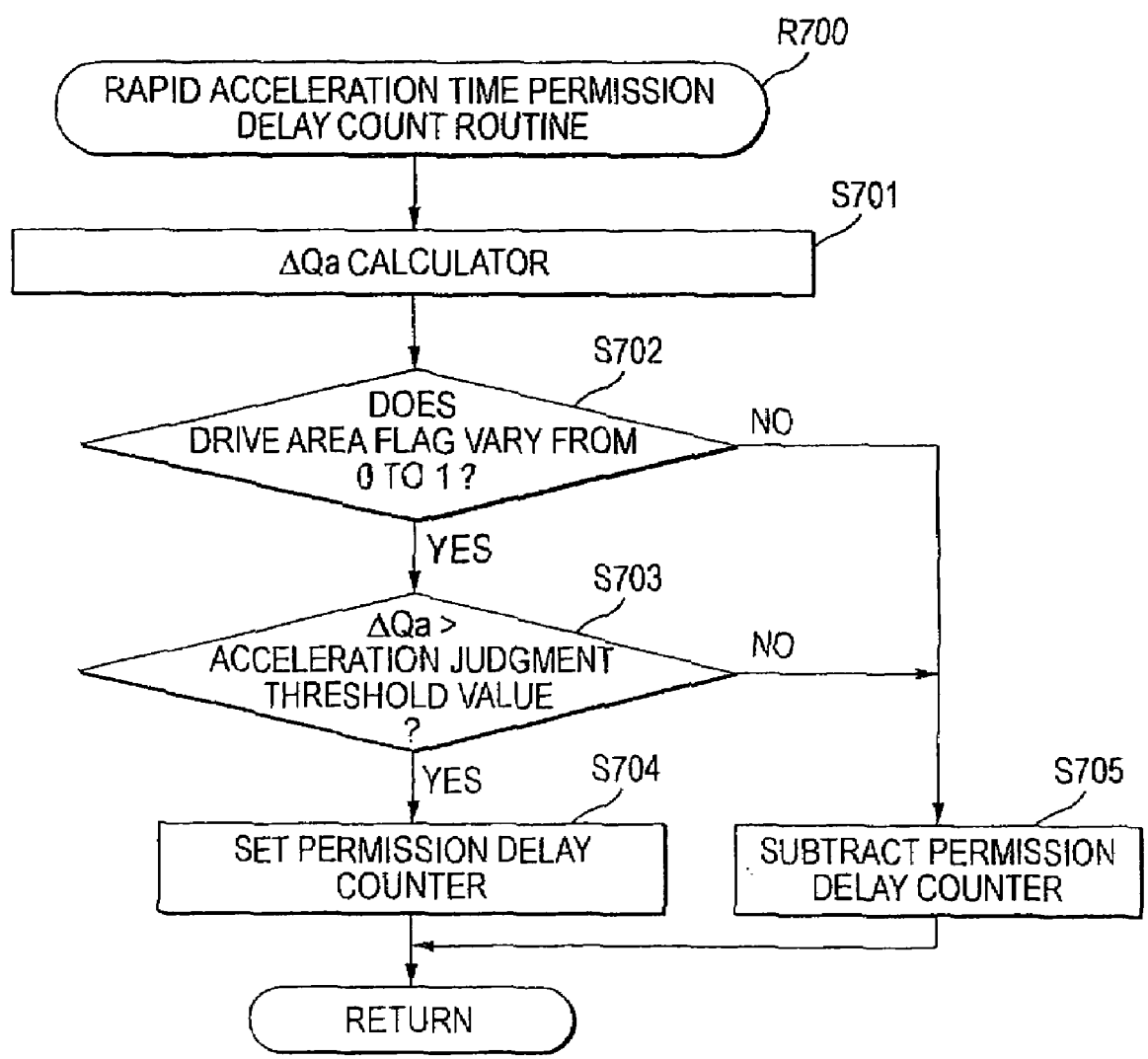
FIG. 14 is a flowchart showing a permission delay count routine under rapid acceleration according to the second embodiment.

In the catalyst deterioration diagnosis permission judging routine 210 shown in FIG. 13, the drive area judgment is carried out in the first step S201. In step S201, the processing jumps to the drive area judging routine R300 shown in FIG. 5, and the drive area judging routine R300 is executed as in the case of the first embodiment. In the next step S202 shown in FIG. 13, the processing jumps to the diagnosis prohibition time count routine R400 shown in FIG. 6, and the diagnosis prohibition time count routine R400 is executed as in the case of the first embodiment. In the catalyst deterioration diagnosis permission judging routine R210, the processing goes to step S210 subsequent to the step S202. In this step S210, the processing jumps to a rapid acceleration time permission delay count routine R700 shown in FIG. 14, and the rapid acceleration time permission delay count routine R700 is executed.

In the rapid acceleration time permission delay count routine R700, the present value is subtracted from the previous value of the intake air amount Qa in the first step S701 to calculate a variation amount ΔQa of the intake air amount. In the next step S702, it is judged whether the drive area flag FDR is varying from 0 to 1. In the diagnosis area judging routine R300 shown in FIG. 5, when the internal combustion engine 10C is set to a driving area in which the cooing water temperatures Wt of the internal combustion engine 100 satisfies the condition: Wt>Wt1, and also the intake air amount Qa satisfies the condition: Qa1≦Qa<Qa2, the drive area flag FDR is varying from 0 to 1. Accordingly, when the internal combustion engine 100 is set to such a drive area, the judgment result of the step S702 is YES, and the processing goes to step S703.

In step S703, the variation amount ΔQa of the intake air amount calculated in step S701 is larger than the acceleration judgment threshold value AJT. If the variation amount ΔQa of the intake air amount is larger than the acceleration judgment threshold value AJT, the judgment result of the step S703 is YES, and the catalyst deterioration diagnosis is judged as being possible under the rapid acceleration state of the internal combustion engine 100. Therefore, the processing goes to the next step S704 to set the permission delay counter CAD, and then returns to the step S210 of the catalyst deterioration diagnosis permission judging routine R210 shown in FIG. 13. If at least one or both of the judgment result of the steps S702 and S703 are NO, the processing goes to step S705, and the permission delay counter CAD is subtracted by only 1 in this step S705. Thereafter, the processing returns to the step S210 of the catalyst deterioration diagnosis permission judging routine R201 shown in FIG. 13. The permission delay counter CAD is also constructed by RAM 134 and CPU 132.

The permission delay counter CAD is subtracted by only 1 every time the rapid acceleration time permission delay count routine R700 is started and the step S705 is executed, and the subtraction is stopped when the count value is equal to zero. In the second embodiment, the rapid acceleration of the internal combustion engine 100 is judged on the basis of the variation of the intake air amount Qa, however, the rapid acceleration of the internal combustion engine 100 may be judged on the basis of the variation of the opening degree of an accelerator or the internal pressure of the intake pipe.

Returning to the catalyst deterioration diagnosis permission judging routine R210 of FIG. 13, the step S203 is executed subsequently to the step S210. This step S203 is the same as the step S203 of FIG. 4, and in this step S203, it is judged whether the drive area flag FDR is set to 1. If the drive area flag FDR is set to 1, the judgment result of the step S203 is YES, and then the processing goes to step S204. The step S204 is the same as the step S204 of FIG. 4, and it is judged whether the count value of the diagnosis prohibition counter CCI is equal to zero. If the count value of the diagnosis prohibition counter CCI is equal to zero, the judgment result of the step S204 is YES, and the processing goes to the next step S211. In step S211, it is judged whether the count value of the permission delay counter CAD is equal to zero. If the judgment result of the step S211 is YES, the processing goes to step S205 to set the diagnosis permission flag FCA to 1.

In the second embodiment, the drive area flag FDR is set to 1. If the count value of the diagnosis prohibition counter CCI is equal to zero and also the count value of the permission delay counter CAD is not equal to zero, the diagnosis permission flag FCA is not set to 1. In other words, the drive area flag FDR is set to 1, and when the count value of the permission delay counter CAD is equal to zero after lapse of a predetermined time after the count value of the diagnosis prohibition counter CCI is equal to zero, the diagnosis permission flag FCA is set to 1. If the judgment result of any one of the steps S203, S204 and S211 is NO, the processing goes to step S206, and the diagnosis permission flag FCA is reset to zero. The processing returns from the steps S205, S206 to the catalyst deterioration diagnosing routine R100 of FIG. 3.

The behaviors of the respective parameters in the catalyst deterioration diagnosis permission judging routine R210 will be described with reference to FIGS. 15(a)-(n), (p)-(r) and FIGS. 16(a)-(n), (p)-(r). FIGS. 15(a)-(n), (p)-(r) show the behaviors of the respective parameters when the catalyst 122 is not deteriorated, and FIGS. 16(a)-(n), (p)-(r) show the behaviors of the respective parameters when the catalyst 122 is deteriorated. FIG. 15(p), FIG. 16 represents an intake air amount Qa, FIG. 15(q), FIG. 16(q) represents a variation mount ΔQa of the intake air amount Qa, and FIG. 15(r), FIG. 16(r) represents a count value of the permission delay counter CAD. The other parameters of FIGS. 15(a)-(n) and FIGS. 16(a)-(n) are the same as the parameters shown in FIGS. 9(a)-(n) and FIGS. 10(a)-(n).

In FIGS. 15(a)-(n), (p)-(r) and FIG. 16(a)-(n), (p)-(r), when the driver suddenly starts movement of the vehicle from the idle state, as shown in FIG. 15(p) and FIG. 16(p), the intake air amount Qa rapidly increases and reaches the predetermined value Qa, and at the timing A at which the intake air amount Qa reaches a predetermined value Qa1, the drive area flag FDR is set to 1 as shown in FIG. 15(a), FIG. 16(a). At this timing A, the drive area flag FDR is set to 1, and at the same time the count value of the permission delay counter CAD is set to a predetermined value as shown in FIG. 15(r), FIG. 16(r). Thereafter, the permission delay counter CAD is subtracted by only 1 every time the catalyst deterioration diagnosis permission judging routine R210 is started and the step S210 is executed, and it is set to zero at the timing A1. At the timing A1, the count value of the permission delay counter CAD is equal to zero, and the diagnosis permission flag FCA is set to 1. The behaviors of the other parameters are the same as FIGS. 9(a)-(n) and FIGS. 10(a)-(n).

In the second embodiment, a predetermined delay time may be given between the timing A at which the internal combustion engine 100 is rapidly accelerated and the timing A1 at which the catalyst deterioration diagnosis is started. The predetermined delay time is the delay between the timing A and the timing A1, and in the second embodiment, it is given by the permission delay counter CAD. The predetermined delay time is effective to prevent the overlap between the rapid acceleration of the internal combustion engine 100 and the catalyst deterioration diagnosis, and prevent the exhaust amount of carbon monoxide gas (CO) from being worse. The effect of the second embodiment will be further described in more detail.

In the intake port type fuel injection system in which the fuel injection valve 115 is secured to a just-before intake port of the intake valve 105, the fuel injected from the fuel injection valve 115 temporarily adheres to the intake port, and then it is sucked into the combustion chamber 103. Therefore, when the fuel injection amount changes largely in such a case that the internal combustion engine 100 is rapidly accelerated, suction of the fuel into the combustion chamber 103 is delayed, and the correction of the air-fuel ratio is insufficient in the upstream air-fuel ratio feedback control means 160, so that the upstream air-fuel ratio may be leaner than the target upstream air-fuel ratio AFT. Furthermore, in a machine type to which an acceleration increasing correction to increase the fuel injection amount from the fuel injection valve 115 is applied at the acceleration time of the internal combustion engine 100, the air-fuel ratio is excessively corrected at the rapid acceleration time of the internal combustion engine 100, and thus richer than the theoretical air-fuel ratio in some cases. In any case, the upstream air-fuel ratio is frequently deviated from the theoretical air-fuel ratio at the rapid acceleration time of the internal combustion engine 100, so that an air-fuel ratio correction spike of the air-fuel ratio feedback control device 150 occurs.

FIGS. 17(a)-(e) and FIGS. 18(a)-(e) show the relationship between the air-fuel ratio correction spike SP at the rapid acceleration time of the internal combustion engine 100 and the air-fuel ratio variation OSC caused by the catalyst deterioration diagnosis. FIGS. 17(a)-(e) show a case where the catalyst deterioration diagnosis is executed while overlapped with the rapid acceleration of the internal combustion engine 100, and FIGS. 18 (a)-(n) show a case where the catalyst deterioration diagnosis is executed after a predetermined delay time elapses from the rapid acceleration of the internal combustion engine 100 according to the second embodiment. FIG. 17(a), FIG. 18(a) represents the intake air amount Qa, FIG. 17(b), FIG. 18(b) represents the upstream air-fuel ratio detection output RO1, FIG. 17(c), FIG. 18(c) represents the oxygen adsorption amount OAV in the catalyst 122, and FIG. 17(d), FIG. 18(d) represents the downstream air-fuel ratio detection output RO2. In FIG. 17(c) and 18(c), a saturated value OAVU and an insufficient value OAVL for the oxygen adsorption amount OAV are indicated by broken lines.

When the catalyst deterioration diagnosis is executed while overlapped with the rapid acceleration of the internal combustion engine 100, as shown in FIG. 17(b), the upstream air-fuel ratio detection output RO1 varies so that the air-fuel ratio correction spike SP based on the rapid acceleration of the internal combustion engine 100 is superposed on the air-fuel ratio variation OSC based on the air-fuel ratio variation output AFOSC. Therefore, as shown in FIG. 17(c), the oxygen adsorption amount OAV in the catalyst 122 is saturated, and as shown in FIG. 17(e), the exhaust amount of carbon monoxide (CO) is increased. As compared with this, according to the second embodiment, a predetermined delay time is given between the timing A at which the intake amount Qa exceeds a predetermined value Qa due to the rapid acceleration of the internal combustion engine 100 and the timing Aa at which the catalyst deterioration diagnosis is started as shown in FIGS. 18(a)-(n). At the timing A, the upstream air-fuel ratio correction spike SP occurs in connection with the rapid acceleration of the internal combustion engine 100. However, at the timing Aa after a predetermined time elapses from the upstream air-fuel ratio correction spike SP, the air-fuel ratio variation OSC caused by the catalyst deterioration diagnosis occurs. Therefore, the air-fuel ratio variation OSC is not overlapped with the air-fuel ratio correction spike SP. According to the second embodiment, as shown in FIG. 18(c), the catalyst deterioration diagnosis can be started at the timing Aa at which the oxygen adsorption amount OAV in the catalyst 122 is stabilized, and the exhaust amount of carbon monoxide gas (CO) can be prevented from being worse by the catalyst deterioration diagnosis.

As described above, according to the second embodiment, as in the case of the first embodiment, the deterioration diagnosis prohibition time of the catalyst 122 is set by the diagnosis prohibition counter CCI after the deterioration diagnosis of the catalyst 122 is finished. For this deterioration diagnosis prohibition time, the deterioration diagnosis of the catalyst 122 is prohibited, and the harmful gas purifying function of the catalyst 122 is restored, so that the harmful gas purifying function of the catalyst 122 can be prevented from being degraded. In addition, according to the second embodiment, the diagnosis start of the catalyst 122 is delayed at the rapid acceleration time of the internal combustion engine 100 by the permission delay counter CAD to prevent the upstream air-fuel ratio correction spike SP and the air-fuel ratio variation OSC from being overlapped with in connection with the rapid acceleration of the internal combustion engine 100, so that the exhaust amount of carbon monoxide gas (CO) can be prevented from being worse by the catalyst deterioration diagnosis.

Third Embodiment

Figure 19:
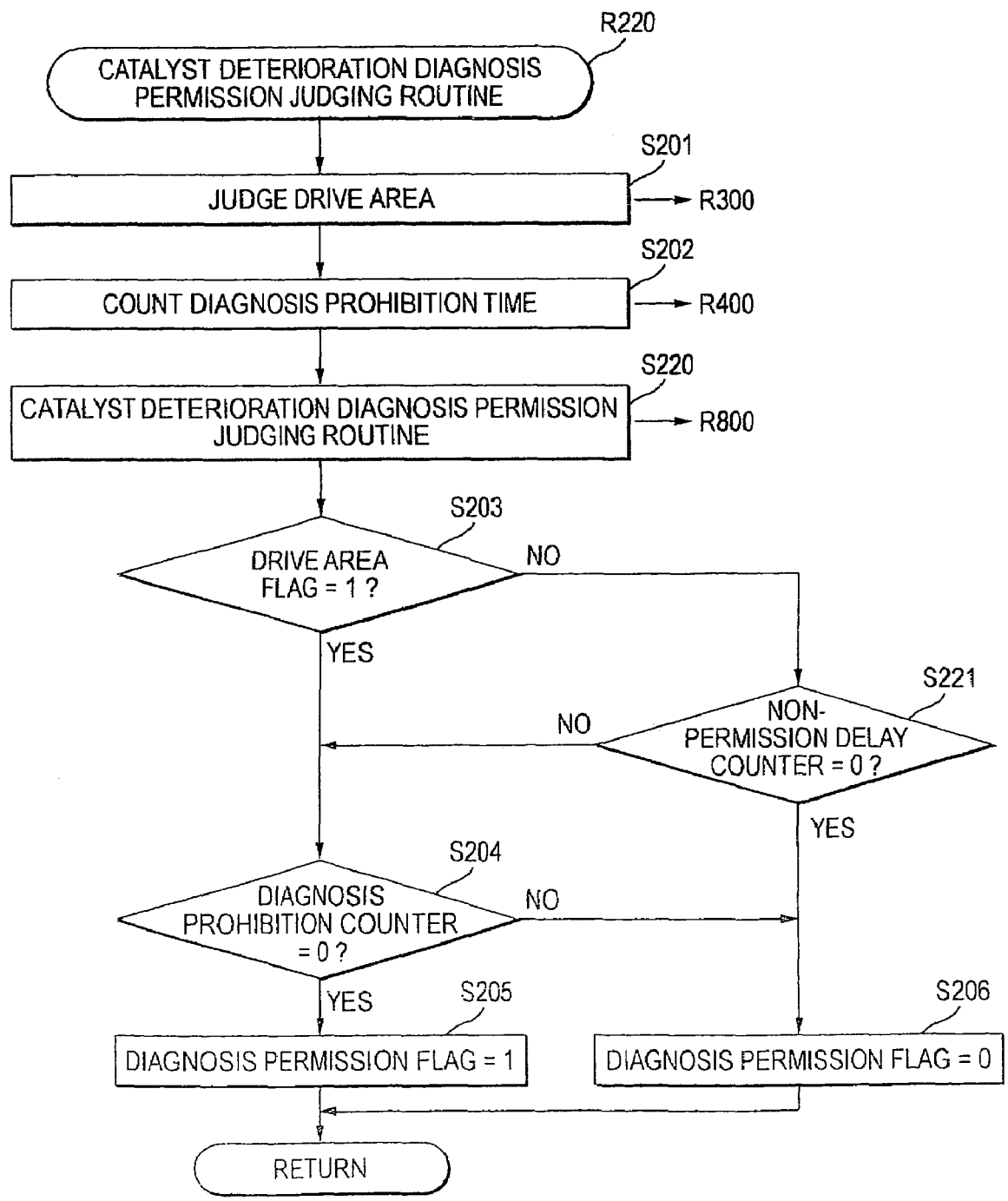
FIG. 19 is a flowchart showing a catalyst deterioration diagnosis permission judging routine according to a third embodiment of the air-fuel ratio feedback control device of the present invention.

According to a third embodiment, in step S101 of FIG. 3, the processing jumps to the catalyst deterioration diagnosis permission judging routine R220 shown in FIG. 19. In the first embodiment, the processing jumps to the catalyst deterioration diagnosis permission judging routine R200 shown in FIG. 4 in step S101. However, in the third embodiment, a catalyst deterioration diagnosis permission judging routine R220 shown in FIG. 19 is used in place of the catalyst deterioration diagnosis permission judging routine R200 shown in FIG. 4. The other constructions are the same as the first embodiment.

Figure 20:
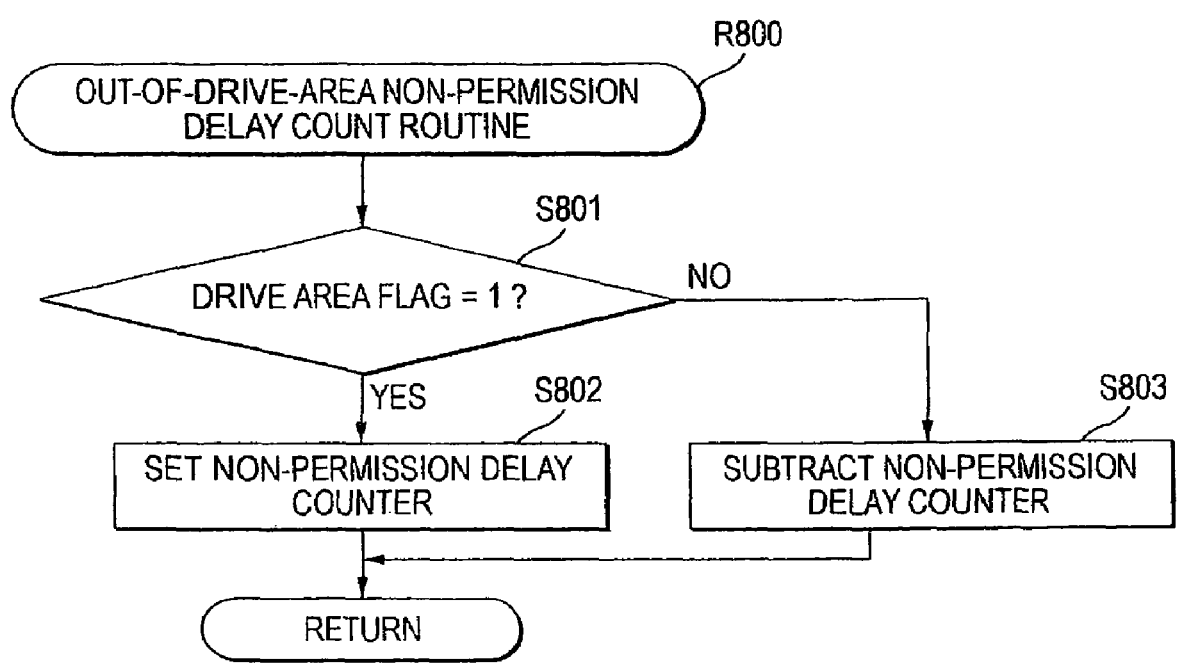
FIG. 20 is a flowchart showing a non-permission delay count routine out of a diagnosis driving area according to the third embodiment.

In the catalyst deterioration diagnosis permission judging routine R220 shown in FIG. 19, the drive area judgment is carried out in the first step S201. In this step S201, the processing jumps to the drive area judging routine R300 shown in FIG. 5, and the drive area judging routine R300 is executed as in the case of the first embodiment. Furthermore, in step S202 subsequent to the step S201, the processing jumps to the diagnosis prohibition time count routine R400 shown in FIG. 6, and the diagnosis prohibition time count routine R400 is executed as in the case of the first embodiment. In the catalyst deterioration diagnosis permission judging routine R220, the process goes to the step S220 subsequent to the step S202. In this step S220, the processing jumps to an out-of-drive-area non-permission delay count routine R800 shown in FIG. 20, and the out-of-drive-area non-permission delay count routine R800 is executed.

In the out-of-drive-area non-permission count routine R800, it is judged in the first step S801 whether the drive area flag FDR is set to 1. If the drive area flag FRD is set to 1, the judgment result of the step S801 is YES, and then the processing goes to the next step S802. If the judgment result of the step S801 is NO, the processing goes to step 803.

In step S802, a non-permission delay counter CND is set and the processing returns to the step S220 of the catalyst deterioration diagnosis permission judging routine R220. In step S803, the non-permission delay counter CND is subtracted by only 1, and the processing returns to the step S220 of the catalyst deterioration diagnosis permission judging routine R220. The non-permission delay counter CND is also constructed by RAM 134 and CPU 132.

In the catalyst deterioration diagnosis permission judging routine R220 shown in FIG. 19, the step S203 is executed subsequently to the step S220. The step S203 is the same as the step S203 of FIG. 4, and it is judged in step S203 whether the drive area flag FDR is set to 1. If the drive area flag FDR is set to 1, the judgment result of the step S203 is YES, and then the processing goes to the next step S204. This step S204 is the same as the step S204 of FIG. 4. In step S204, it is judged whether the count value of the diagnosis prohibition counter CCI is equal to zero. If the count value of the diagnosis prohibition counter CCI is equal to zero, the judgment result of the step S204 is YES, and then the processing goes to the next step S205 to set the diagnosis permission flag FCA to 1. Furthermore, if the judgment result of the step S203 is NO, the processing goes to step S221. In step S221, it is judged whether the count value of the non-permission delay counter CND is equal to zero. If the judgment result of this step S211 is YES, the processing goes to step S206 to set the diagnosis permission flag FCA to zero. If the judgment result of the step S221 is NO, the processing goes to step S204. If the judgment result of the step S204 is NO, the processing goes to step S206, and the diagnosis permission flag FCA is set to zero. Then, the processing returns from the steps S205, S206 to the step S102 of FIG. 3.

The diagnosis permission flag FCA is not set to zero insofar as the non-permission delay counter CND is not set to zero, and it is kept to 1. Unless the non-permission delay counter CND is equal to zero, the out-of-drive-area non-permission delay count routine R800 is started, and it is subtracted by only 1 every time the step S705 is executed. When the count value concerned is equal to zero, the subtraction concerned is stopped. A predetermined delay time is given during the time period from the timing at which the non-permission delay counter CND is set to a predetermined value in step S802 of FIG. 20 till the time when the count value thereof is subtracted to zero.

Figure 21:
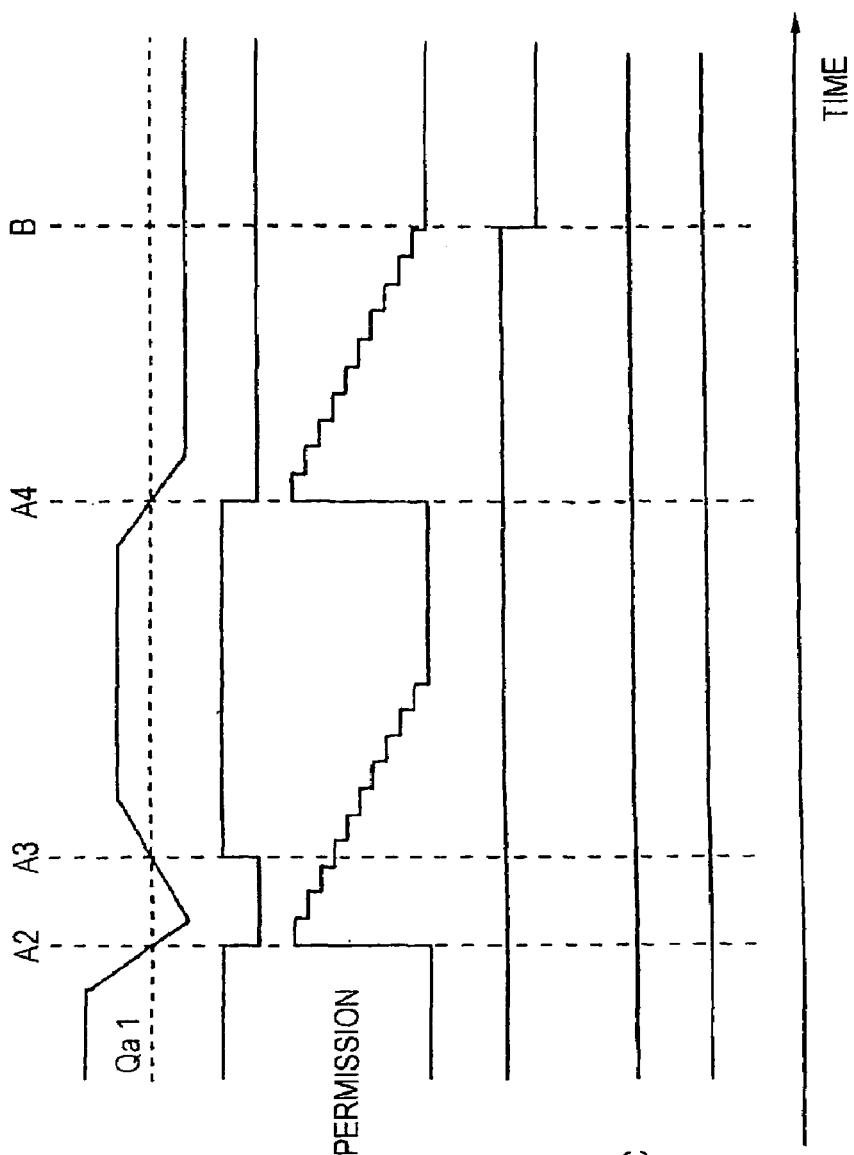
FIGS. 21(a)-(f) are time charts showing the behavior of some parameters at the catalyst deterioration diagnosis time according to the third embodiment.

The behavior of each parameter in the catalyst deterioration diagnosis permission judging routine R220 will be described with reference to FIGS. 21(a)-(f). FIG. 21(a) represents an intake air amount Qa, FIG. 21(b) represents the drive area flag FDR, FIG. 21(c) represents the count value of the non-permission delay counter CND, FIG. 21(d) represents the diagnosis permission flag FCA, FIG. 21(e) represents the diagnosis end flag FCC and FIG. 21(f) represents the count value of the diagnosis prohibition counter CCI.

It is assumed that under the state that the diagnosis permission flag FCA is set to 1 and the deterioration diagnosis of the catalyst 122 is executed, the driver accelerates the internal combustion engine 100 immediately after decelerating the internal combustion engine 100. In this case, at the timing A2 at which the internal combustion engine 100 is decelerated and the intake air amount Qa is smaller than a predetermined value Qa1, the drive area flag FDR is reset to 0, and at the same time, subtraction of the non-permission delay counter CND is started. Thereafter, when the intake air amount Qa is equal to the predetermined value Qa1 or more by re-acceleration of the internal combustion engine 100 at the timing A3 at which the non-permission delay counter does not reach zero, the drive area flag FDR is set to 1 again. Accordingly, the diagnosis permission flag FCA is not reset to zero even at the timing A3, and thus the catalyst deterioration diagnosis is continued.

If the deceleration state of the internal combustion engine 100 is continued even after the drive area flag FDR is reset to zero at the timing A4 at which the driver decelerates the internal combustion engine 100 and the intake air amount Qa is smaller than the predetermined value Qa1, the diagnosis permission flag FCC is reset to zero at the timing B at which the count value of the non-permission delay counter CND is equal to zero. A predetermined delay time is given between the timing A2 and the timing A4 and between the timing A4 and the timing B by the non-permission delay counter CND.

If the deterioration diagnosis is interrupted even for such a short time that the catalyst deterioration diagnosis is not effected, for example, the opportunity of catalyst deterioration diagnosis is remarkably lost in such a driving condition that acceleration and deceleration are repeated at a relatively low speed such as a driving condition in a city area or the like. According to the third embodiment, even when the drive area flag FDR is reset to zero at the timing A2, the count value of the non-permission delay counter CND is not equal to zero if the time is too short to affect the catalyst deterioration diagnosis. Therefore, by continuing the state that the diagnosis permission flag FCC is set to 1, the opportunity of the catalyst deterioration diagnosis can be made proper.

As described above, according to the third embodiment, as in the case of the first embodiment, the deterioration diagnosis prohibition time of the catalyst 122 is set by the diagnosis prohibition counter CCI after the deterioration diagnosis of the catalyst 122 is finished. For this deterioration diagnosis prohibition time, the deterioration diagnosis of the catalyst 122 is prohibited, the harmful gas purifying function of the catalyst 122 is restored, and thus the degradation of the harmful gas purifying function of the catalyst 122 can be prevented. In addition, according to the third embodiment, even when the internal combustion engine 100 is temporarily decelerated, the catalyst deterioration diagnosis can be continued by the non-permission delay counter CND, so that an effective deterioration diagnosis of the catalyst 122 can be performed.

Fourth Embodiment

Figure 22:
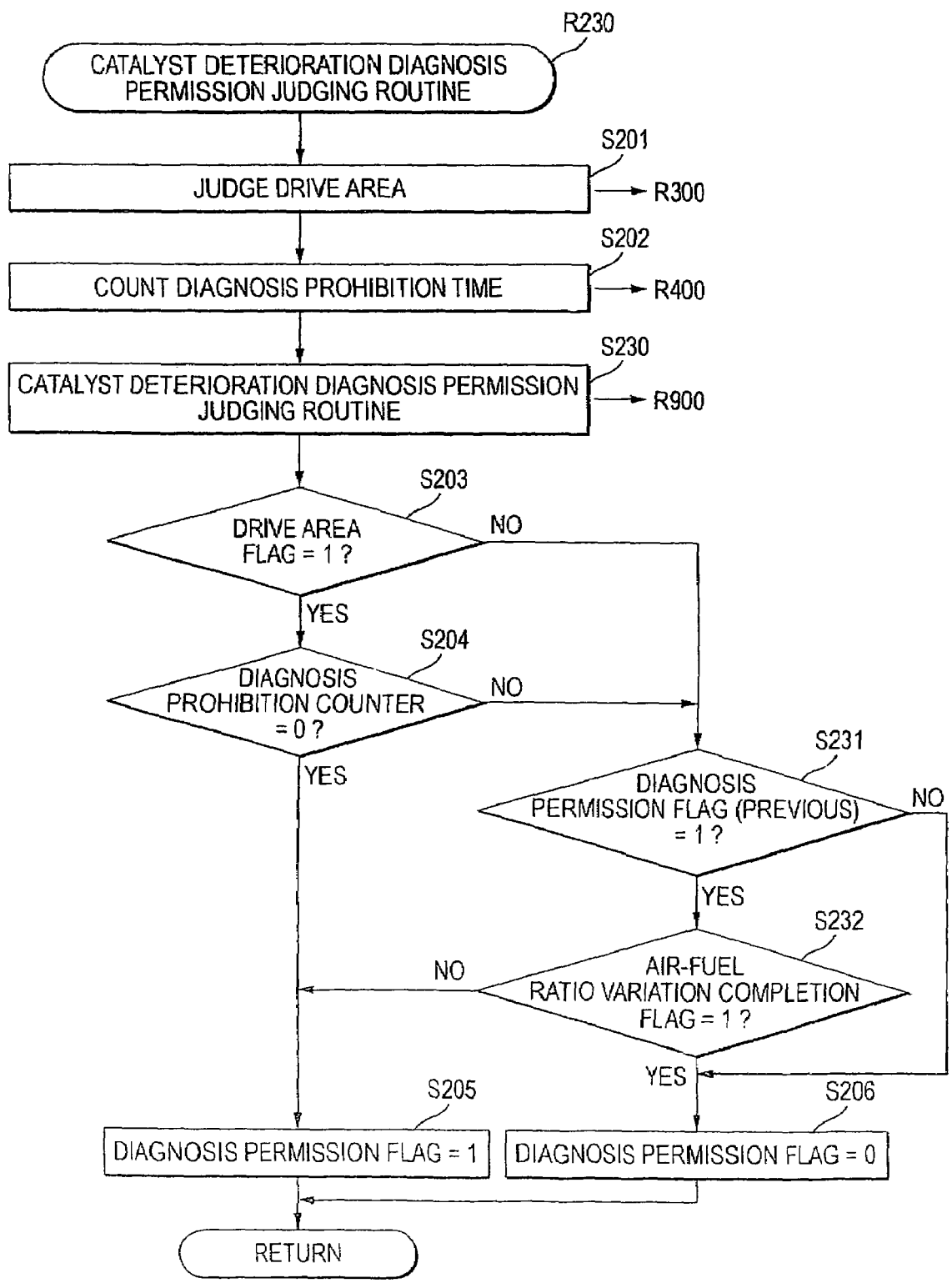
FIG. 22 is a flowchart showing a catalyst deterioration diagnosis permission judging routine according to a fourth embodiment of the air-fuel ratio feedback control device of the present invention.

According to a fourth embodiment, the processing jumps to a catalyst deterioration diagnosis permission judging routine R230 shown in FIG. 22 in step S101 of FIG. 3. In the first embodiment, the processing jumps to the catalyst deterioration diagnosis permission judging routine R200 shown in FIG. 4 in step S101. However, in the fourth embodiment, the catalyst deterioration diagnosis permission judging routine R230 shown in FIG. 22 is used in place of the catalyst deterioration diagnosis permission judging routine R200 shown in FIG. 4. The other constructions are the same as the first embodiment.

Figure 23:
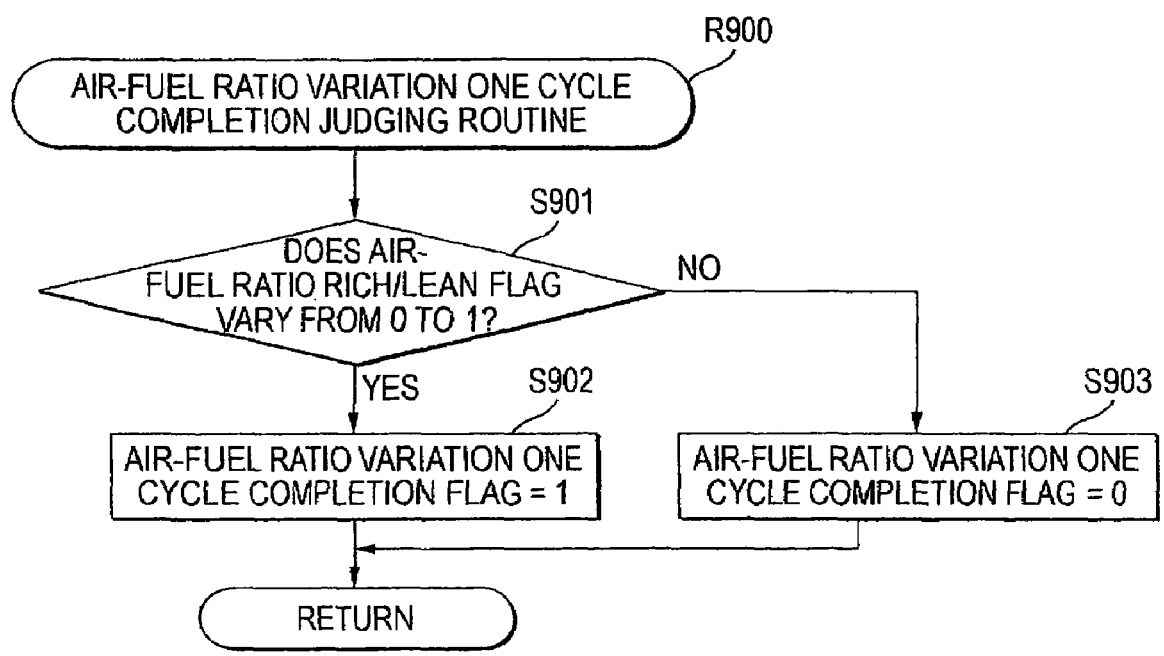
FIG. 23 is a flowchart showing an air-fuel ratio variation 1 cycle completion judging routine according to the fourth embodiment.
Figure 27A:
FIGS. 27(a)-(c) are diagrams showing the principle of the catalyst deterioration diagnosis.
Figure 27B:
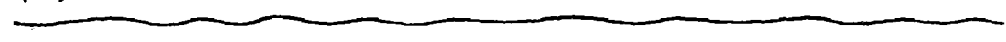
Figure 27C:
Figure 28:
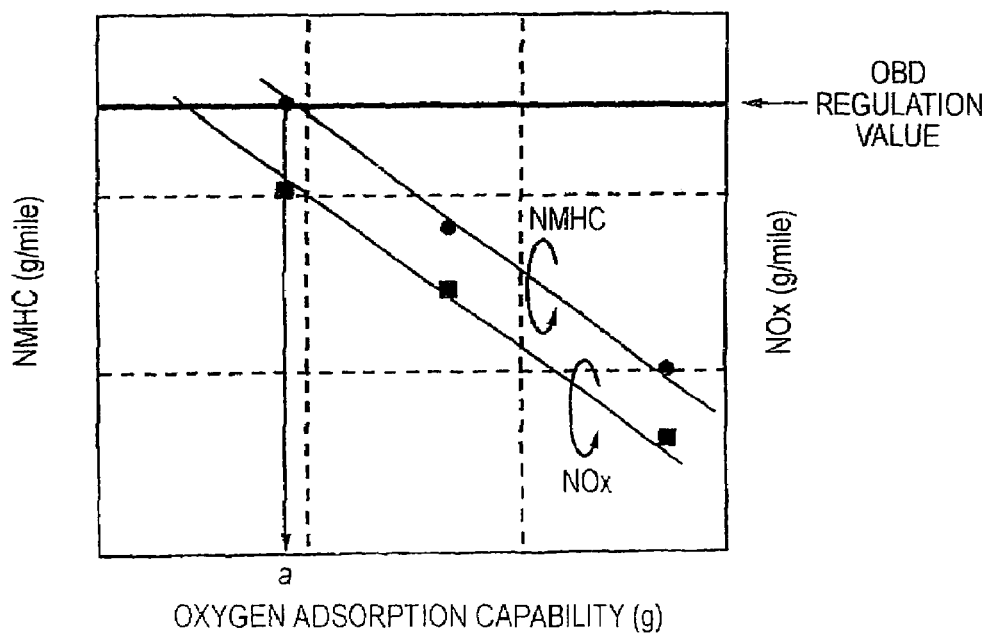
FIG. 28 is a characteristic diagram showing the relationship between the oxygen adsorption capability of the catalyst and each of non-methane hydrocarbon gas and nitrogen oxide gas.

In the catalyst deterioration diagnosis permission judging routine R230 shown in FIG. 22, the drive area judgment is carried out in the first step S201. In step S201, the processing jumps to the drive area judging routine R300 shown in FIG. 5, and the drive area judging routine R300 is executed as in the case of the first embodiment. In the step S202 subsequent to the step S201, the diagnosis prohibition time count is carried out. The processing jumps to the diagnosis prohibition time count routine R400 shown in FIG. 6 in step S202, and the diagnosis prohibition count routine R400 is executed as in the case of the first embodiment. In the catalyst deterioration diagnosis permission judging routine R230, the processing goes to step S230 subsequent to the step S202. In this step S230, the processing jumps to an air-fuel ratio variation one cycle completion judging routine R900 shown in FIG. 23, and the air-fuel ratio variation one cycle completion judging routine R900 is executed.

In the air-fuel ratio variation one cycle completion judging routine R900, it is judged in the first step S901 whether the air-fuel ratio rich lean flag FAFRL is varying from 0 to 1. The air-fuel ratio rich lean flag FAFRL varies periodically in accordance with the air-fuel ratio variation output AFOSC, and the variation from 0 to 1 occurs at the completion time point of each cycle of the air-fuel ratio variation output AFOSC, so that the time point at which each cycle of the air-fuel ratio variation output AFOSC is completed is detected as a result in step S901. If the present time is the time point at which each cycle of the air-fuel ratio variation output AFOSC is completed, the judgment result of the step S901 is YES, and the processing goes to step S902. In this step S902, an air-fuel ratio variation one cycle completion flag FOSCCC is set to 1, and then the processing returns to the step S230 of FIG. 22. If the judgment result of the step S901 is NO, the processing goes to step S903. In this step S903, the air-fuel ratio variation one cycle completion flag FOSCCC is reset to zero, and the processing returns to the step S230 of FIG. 22.

In the catalyst deterioration diagnosis permission judging routine R230 of FIG. 22, the step S203 subsequent to the step S230 is executed. This step S203 is the same as the step S203 of FIG. 4, and it is judged in step S203 whether the drive area flag FDR is set to 1. If the drive area flag FDR is set to 1, the judgment result of the step S203 is YES, and the processing goes to the next step S204. This step S203 is the same as the step S203 of FIG. 4, and it is judged in step S204 whether the diagnosis prohibition counter CCI is equal to zero. If the diagnosis prohibition counter CCI is equal to zero, the judgment result of the step S204 is YES, and the processing goes to the next step S205 to set the diagnosis permission flag FCA to 1.

Furthermore, if any one or both of the judgment result of the step S203 and the judgment result of the step S204 are NO, the processing goes to step S231. In step S231, it is judged whether the previous value of the diagnosis permission flag FCA is equal to 1. If the judgment result of the step S231 is YES, the processing goes to step S232. In step S232, it is judged whether the air-fuel ratio variation one cycle completion flag FOSCCC is equal to 1. If the judgment result of the step S232 is NO, the processing goes to step S205, and the diagnosis permission flag FCA is set to 1. If the judgment result of the step S231 is NO and also the judgment result of the step S232 is YES, the processing goes to step S206, and the diagnosis permission flag FCA is reset to zero in step S206. The processing returns from the steps S205, S206 to the step S102 of FIG. 3.

In the catalyst deterioration diagnosis permission judging routine R230 shown in FIG. 22, when the judgment result of the step S203 is NO, that is, the drive area flag FDR is equal to zero, the judgment result of the step S204 is NO, that is, the diagnosis prohibition counter CCI is not equal to zero, and the judgment result of the step S231 is YES, that is, the previous value of the diagnosis permission flag FCA is equal to 1, the processing goes to step S232, and the processing goes to step S205 to keep the diagnosis permission flag FCR to 1 until the air-fuel ratio variation one cycle completion flag FOSCCC is set to 1.

The behavior of each parameter in the catalyst deterioration diagnosis permission judging routine R230 will be described with reference to FIGS. 24(a)-(f). FIG. 24(a) represents the drive area flag FDR, FIG. 24(b) represents the air-fuel ratio rich lean flag FAFRL, FIG. 24(c) represents the diagnosis permission flag FCA, FIG. 24(d) represents the diagnosis end flag FCC, FIG. 24(e) represents the counter value of the diagnosis prohibition counter CCI, and FIG. 24(f) represents the upstream air-fuel ratio detection output RO1. In FIG. 24(f), the target upstream air-fuel ratio AFT is indicated by a broken line.

In FIGS. 24(a)-(f), even when the drive area flag FDR is reset to zero, for example at the timing A5 under the state that the drive area flag FDR is set to 1, the diagnosis permission flag FCA is set to 1 and the upstream air-fuel ratio variation AFOSC is repeated, the state that the diagnosis permission flag FCA is set to 1 is continued till the timing A6. The timing A6 is the timing at which the air-fuel ratio rich lean flag FAFRL varies from 0 to 1 after the timing A5 and one cycle of the air-fuel ration variation AFOSC is completed. A delay time is given to the reset of the diagnosis permission flag FCA during the period from the timing A5 to the timing A6, and the diagnosis permission flag FCA is reset to 0 after the delay time concerned elapses.

The delay time between the timing A5 and the timing A6 brings an effect of preventing degradation in purification rate of carbon monoxide gas (CO) due to the air-fuel ratio disturbance. This effect will be described with reference to FIGS. 25(a)-(g) and FIGS. 26(a)-(g). FIG. 25(a), FIG. 26(a) represents the drive area flag FDR, FIG. 25(b), FIG. 26(b) represents the air-fuel ratio rich lean flag FAFRL, FIG. 25(c), FIG. 26(c) represents the diagnosis permission flag FCA, FIG. 25(d), FIG. 26(d) represents the upstream air-fuel ratio detection output RO1, FIG. 25(e), FIG. 26(e) represents the oxygen adsorption amount OAV in the catalyst 122, FIG. 25(f), FIG. 26(f) represents the downstream air-fuel ratio detection output RO2, and FIG. 25(g), FIG. 26(g) represents the CO gas discharge amount. In FIG. 25(d) and FIG. 26(d), the upstream air-fuel ratio detection output RO1 is indicated by a solid line, and the target upstream air-fuel ratio AFT is indicated by a broken line. In FIG. 25(e) and FIG. 26(e), a saturation value OAVU and an insufficient value OAVL to the in-catalyst oxygen adsorption amount OAV are shown. In FIG. 25(f) and FIG. 26(f), the downstream air-fuel ratio detection output RO2 is indicated by a solid line.

FIGS. 25(a)-(g) show a case where the drive area flag FDR is reset to 0 at the timing A5, the diagnosis permission flag FCA is also reset to 0 at the timing A5 in connection with the reset of the drive area flag FDR, and the catalyst deterioration diagnosis is stopped. As shown in FIGS. 25(a)-(g), if the diagnosis permission flag FCA is reset to 0 at the timing A5 in process of the catalyst deterioration diagnosis, thereby stopping the upstream air-fuel ratio variation AFOSC, the in-catalyst oxygen adsorption amount OAV is deviated from the center thereof after the timing A5, and the catalyst is weaker to the air-fuel ratio disturbance. In the case of FIGS. 25(a)-(g), after the diagnosis permission flag FCA is reset to 0, the upstream air-fuel ratio detection output RO1 becomes rich as shown in FIG. 25(d). In connection with this, the in-catalyst oxygen adsorption amount OAV lacks as shown in FIG. 25(f), and the purification rate of carbon monoxide gas (CO) is degraded as shown in FIG. 25(g).

FIGS. 26(a)-(g) show a case where the degradation of the purification rate of carbon monoxide gas (CO) due to the air-fuel ratio disturbance can be prevented in accordance with the fourth embodiment. In FIGS. 26(a)-(g), even when the drive area flag FDR is reset to 0 at the timing A5, the air-fuel ratio variation one cycle is not completed. Therefore, the state that the diagnosis permission flag FCA is set to 1 is continued until the timing A6 at which the air-fuel ratio variation one cycle is next completed. By the delay time between the timing A5 and the timing A6, the oxygen adsorption amount OAV of the catalyst 122 can be made closer to the center even after the timing A5 as shown in FIG. 26(e), and the purification rate of the carbon monoxide gas (CO) can be enhanced as shown in FIG. 26(g), the in-catalyst oxygen adsorption amount OAV can be restored to the original optimum state before the diagnosis, and the catalyst 122 is stronger to the air-fuel ratio disturbance.

According to the fourth embodiment, as in the case of the first embodiment, the deterioration diagnosis prohibition time of the catalyst 122 is set by the diagnosis prohibition counter CCI after the deterioration diagnosis of the catalyst 122 is finished. For the deterioration diagnosis prohibition time, the deterioration diagnosis of the catalyst 122 is prohibited, and the harmful gas purifying function of the catalyst 122 is restored, whereby the degradation in the harmful gas purifying function of the catalyst 122 can be prevented. In addition, according to the fourth embodiment, the completion of the air-fuel ratio variation one cycle is detected. Therefore, even when the drive area of the internal combustion engine 100 becomes unsuitable for the catalyst diagnosis in process of the last cycle of the air-fuel ratio variation, the catalyst deterioration diagnosis can be continued until the last cycle is completed, and the in-catalyst oxygen adsorption amount at the end of the deterioration diagnosis can be controlled optimally.

The air-fuel ratio feedback control device of the present invention is applied to a fuel injection system of a vehicle, for example.

Various modifications and alterations of this invention will be apparent to those skilled in the art without departing from the scope and spirit of this invention, and it should be understood that is not limited to the illustrative embodiments set forth herein.

What is claimed is:

1. An air-fuel ratio feedback control device for use in a fuel injection control system for controlling a fuel injection amount for an internal combustion engine comprises:
    a downstream air-fuel ratio sensor disposed at the downstream side of a catalyst set in an exhaust system of the internal combustion engine and outputs a downstream air-fuel ratio detection output;
    downstream air-fuel ratio feedback control means having PI calculating means for calculating a downstream air-fuel ratio feedback amount on the basis of the downstream air-fuel ratio detection output and a target downstream air-fuel ratio;
    an upstream air-fuel ratio sensor disposed at the upstream side of the catalyst and outputs an upstream air-fuel ratio detection output;
    upstream air-fuel ratio feedback control means for generating a correction amount to the fuel injection amount on the basis of the upstream air-fuel ratio detection output, and generating a target upstream air-fuel ratio; and
    catalyst deterioration diagnosing means for carrying out deterioration diagnosis of the catalyst,
    wherein the catalyst deterioration diagnosing means has diagnosis permission judging means for judging permission of the deterioration diagnosis of the catalyst on the basis of a driving area of the internal combustion engine, air-fuel ratio varying means for outputting an air-fuel ratio variation output at a catalyst deterioration diagnosis time by the catalyst deterioration diagnosis means, catalyst deterioration judging means for judging the deterioration of the catalyst on the basis of the downstream air-fuel ratio detection output at the catalyst deterioration diagnosis time, and catalyst deterioration diagnosis prohibiting means for setting a deterioration diagnosis prohibition time for the catalyst after the catalyst deterioration diagnosis, and wherein the upstream air-fuel ratio feedback control means has upstream air-fuel ratio learning calculating means and target upstream air-fuel ratio calculating means, the upstream air-fuel ratio learning calculating means calculates an upstream air-fuel ratio learning calculation amount on the basis of the integration value shifted from the PI calculating means to the upstream air-fuel ratio learning calculating means under the state that the catalyst deterioration diagnosis is not carried out by the catalyst deterioration diagnosis means, the target upstream air-fuel ratio calculating means, at the catalyst deterioration diagnosis time, outputs the target upstream air-fuel ratio on the basis of the downstream air-fuel ratio feedback amount and the air-fuel ratio variation output, and the target upstream air-fuel ratio calculating means, at the state that the catalyst deterioration diagnosis is not carried out, outputs the target upstream air-fuel ratio on the basis of the downstream air-fuel ratio feedback amount and the upstream air-fuel ratio learning calculation amount.

2. The air-fuel ratio feedback control device according to claim 1, wherein the downstream air-fuel ratio feedback control means has a filter means for filtering a downstream air-fuel ratio detection output detected by the downstream air-fuel ratio sensor, and under the state that a deterioration diagnosis of the catalyst is carried out by the catalyst deterioration diagnosing means, a filter constant of the filter means is increased to suppress variation of the downstream air-fuel ratio feedback amount due to variation of the target upstream air-fuel ratio.

3. The air-fuel ratio feedback control device according to claim 1, wherein when it is diagnosed by the catalyst deterioration diagnosing means that the catalyst is deteriorated, the feedback control based on the downstream air-fuel ratio detection output of the downstream air-fuel ratio sensor is stopped.

4. The air-fuel ratio feedback control device according to claim 1, wherein the diagnosis permission judging means delays permission of the catalyst deterioration diagnosis for rapid acceleration of the internal combustion engine.

5. The air-fuel ratio feedback control device according to claim 1, wherein the diagnosis permission judging means continues the state of permitting the deterioration diagnosis of the catalyst even when during the deterioration diagnosis of the catalyst the drive area of the internal combustion engine is temporarily deviated from an area where the catalyst deterioration diagnosis is permitted.

6. The air-fuel ratio feedback control device according to claim 1, wherein the diagnosis permission judging means continues the judgment of the permission of the deterioration diagnosis of the catalyst to continue the variation of the target upstream air-fuel ratio by the air-fuel ratio varying means until the last cycle thereof is completed.

* * * * *